United States Patent
Muma et al.

(10) Patent No.: US 12,192,079 B2
(45) Date of Patent: *Jan. 7, 2025

(54) METHOD AND APPARATUS FOR CARRYING CONSTANT BIT RATE (CBR) CLIENT SIGNALS USING CBR CARRIER STREAMS COMPRISING FRAMES

(71) Applicant: Microchip Technology Inc., Chandler, AZ (US)

(72) Inventors: Scott Muma, Coquitlam (CA); Winston Mok, Vancouver (CA); Steven Scott Gorshe, Beaverton, OR (US)

(73) Assignee: Microchip Technology Inc., Chandler, AZ (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/202,899

(22) Filed: May 27, 2023

(65) Prior Publication Data
US 2023/0300047 A1 Sep. 21, 2023

Related U.S. Application Data

(63) Continuation-in-part of application No. 17/885,194, filed on Aug. 10, 2022, now Pat. No. 11,799,626.

(Continued)

(51) Int. Cl.
*H04L 43/062* (2022.01)
*H04L 43/0894* (2022.01)
(Continued)

(52) U.S. Cl.
CPC ........ *H04L 43/062* (2013.01); *H04L 43/0894* (2013.01); *H04L 7/04* (2013.01); *H04L 2012/5674* (2013.01)

(58) Field of Classification Search
CPC . H04L 7/04; H04L 2012/5674; H04L 43/062; H04L 43/0894; H04J 3/0658
(Continued)

(56) References Cited

U.S. PATENT DOCUMENTS

| | | |
|---|---|---|
| 5,343,482 A | 8/1994 | Penner et al. |
| 5,361,277 A | 11/1994 | Grover |

(Continued)

FOREIGN PATENT DOCUMENTS

| | | |
|---|---|---|
| DE | 102017222442 A1 | 6/2019 |
| EP | 1145477 A1 | 10/2001 |

(Continued)

OTHER PUBLICATIONS

PCT/US2022/041106, International Search Report and Written Opinion, Mailed Nov. 23, 2022.

(Continued)

*Primary Examiner* — Leila Malek
(74) *Attorney, Agent, or Firm* — Glass & Associates; Kenneth Glass

(57) ABSTRACT

A method and apparatus in which a data stream is received that includes constant bit rate (CBR) carrier streams, at least one of which comprises frames, a cumulative phase offset report (CPOR) and a client rate report (CRR). A counter accumulating a PHY-scaled stream clock (IPSCk) is sampled at a nominal sampling period (Tps) to obtain a cumulative PHY-scaled count (CPSC). A PHY-scaled stream phase offset (PSPO) is calculated that indicates phase difference between PHY-scaled stream nominal bit count (LPSD) and an incoming PHY-scaled count delta (IPSD). The data stream is demultiplexed to obtain CBR carrier streams. Respective CBR carrier streams include a previous network node CPOR (CPOR-P) and a previous network node CPO (CPO-P). A CPO is calculated that is a function (Continued)

of CPO-P and PSPO. CPO-P is replaced with the calculated CPO. The CBR carrier streams are multiplexed into intermediate-network-node data streams that are transmitted from the intermediate-network-node.

20 Claims, 14 Drawing Sheets

Related U.S. Application Data

(60) Provisional application No. 63/282,292, filed on Nov. 23, 2021.

(51) Int. Cl.
*H04L 7/04* (2006.01)
*H04L 12/70* (2013.01)

(58) Field of Classification Search
USPC .......................................................... 375/295
See application file for complete search history.

(56) References Cited

U.S. PATENT DOCUMENTS

| | | | |
|---|---|---|---|
| 5,371,765 A | 12/1994 | Guilford | |
| 5,600,824 A | 2/1997 | Williams et al. | |
| 5,640,398 A | 6/1997 | Carr et al. | |
| 5,838,512 A | 11/1998 | Okazaki | |
| 5,850,422 A | 12/1998 | Chen | |
| 5,905,766 A | 5/1999 | Nguyen | |
| 6,044,122 A | 3/2000 | Ellersick et al. | |
| 6,052,073 A | 4/2000 | Carr et al. | |
| 6,138,061 A | 10/2000 | McEnnan et al. | |
| 6,150,965 A | 11/2000 | Carr et al. | |
| 6,188,699 B1 | 2/2001 | Lang et al. | |
| 6,333,935 B1 | 12/2001 | Carr et al. | |
| 6,345,052 B1 | 2/2002 | Tse et al. | |
| 6,359,479 B1 | 3/2002 | Oprescu | |
| 6,501,340 B1 | 12/2002 | Flood | |
| 6,584,521 B1 | 6/2003 | Dillabough et al. | |
| 6,603,776 B1 | 8/2003 | Fedders et al. | |
| 6,668,297 B1 | 12/2003 | Karr et al. | |
| 6,671,758 B1 | 12/2003 | Cam et al. | |
| 6,744,787 B1 | 6/2004 | Schatz et al. | |
| 6,820,159 B2 | 11/2004 | Mok et al. | |
| 6,823,001 B1 | 11/2004 | Chea | |
| 6,829,717 B1 | 12/2004 | Roust | |
| 6,870,831 B2 | 3/2005 | Hughes et al. | |
| 7,117,112 B2 | 10/2006 | Mok | |
| 7,161,999 B2 | 1/2007 | Parikh | |
| 7,165,003 B2 | 1/2007 | Mok | |
| 7,187,741 B2 | 3/2007 | Pontius et al. | |
| 7,203,616 B2 | 4/2007 | Mok | |
| 7,239,650 B2 | 7/2007 | Rakib et al. | |
| 7,239,669 B2 | 7/2007 | Cummings et al. | |
| 7,295,945 B2 | 11/2007 | Mok | |
| 7,388,160 B2 | 6/2008 | Mok et al. | |
| 7,417,985 B1 | 8/2008 | McCrosky et al. | |
| 7,468,974 B1 | 12/2008 | Carr et al. | |
| 7,492,760 B1 | 2/2009 | Plante et al. | |
| 7,593,411 B2 | 9/2009 | McCrosky et al. | |
| 7,656,791 B1 | 2/2010 | Mok et al. | |
| 7,668,210 B1 | 2/2010 | Mok et al. | |
| 7,751,411 B2 | 7/2010 | Cam et al. | |
| 7,772,898 B2 | 8/2010 | Cheung | |
| 7,807,933 B2 | 10/2010 | Mok et al. | |
| 7,817,673 B2 | 10/2010 | Scott et al. | |
| 8,010,355 B2 | 8/2011 | Rahbar | |
| 8,023,641 B2 | 9/2011 | Rahbar | |
| 8,068,559 B1 | 11/2011 | Butcher | |
| 8,085,764 B1 | 12/2011 | McCrosky et al. | |
| 8,139,704 B2 * | 3/2012 | Heinrich | H04N 21/242 375/376 |
| 8,243,759 B2 | 8/2012 | Rahbar | |
| 8,335,319 B2 | 12/2012 | Rahbar | |
| 8,413,006 B1 | 4/2013 | Mok et al. | |
| 8,428,203 B1 | 4/2013 | Zortea et al. | |
| 8,483,244 B2 | 7/2013 | Rahbar | |
| 8,542,708 B1 | 9/2013 | Mok et al. | |
| 8,599,986 B2 | 12/2013 | Rahbar | |
| 8,774,227 B2 | 7/2014 | Rahbar | |
| 8,854,963 B1 | 10/2014 | Muma et al. | |
| 8,913,688 B1 | 12/2014 | Jenkins | |
| 8,957,711 B2 | 2/2015 | Jin et al. | |
| 8,971,548 B2 | 3/2015 | Rahbar et al. | |
| 8,976,816 B1 | 3/2015 | Mok et al. | |
| 8,982,910 B1 | 3/2015 | Zhang et al. | |
| 8,989,222 B1 | 3/2015 | Mok et al. | |
| 9,019,997 B1 * | 4/2015 | Mok | H04Q 11/04 370/503 |
| 9,025,594 B1 | 5/2015 | Mok et al. | |
| 9,209,965 B2 | 12/2015 | Rahbar et al. | |
| 9,276,874 B1 | 3/2016 | Mok et al. | |
| 9,313,563 B1 | 4/2016 | Mok et al. | |
| 9,337,960 B2 | 5/2016 | Zhong | |
| 9,374,265 B1 | 6/2016 | Mok et al. | |
| 9,444,474 B2 | 9/2016 | Rahbar et al. | |
| 9,473,261 B1 | 10/2016 | Tse et al. | |
| 9,503,254 B2 | 11/2016 | Rahbar et al. | |
| 9,525,482 B1 | 12/2016 | Tse | |
| 10,069,503 B2 | 9/2018 | Zhang et al. | |
| 10,079,651 B2 | 9/2018 | Ramachandra | |
| 10,104,047 B2 | 10/2018 | Muma et al. | |
| 10,128,826 B2 | 11/2018 | Jin et al. | |
| 10,218,823 B2 | 2/2019 | Gareau | |
| 10,250,379 B2 | 4/2019 | Haddad et al. | |
| 10,397,088 B2 | 8/2019 | Gareau | |
| 10,432,553 B2 | 10/2019 | Tse | |
| 10,594,329 B1 | 3/2020 | Elkholy | |
| 10,594,423 B1 | 3/2020 | Anand et al. | |
| 10,608,647 B1 | 3/2020 | Ranganathan et al. | |
| 10,715,307 B1 | 7/2020 | Jin | |
| 10,797,816 B1 | 10/2020 | Gorshe et al. | |
| 10,917,097 B1 | 2/2021 | Meyer et al. | |
| 11,108,895 B2 | 8/2021 | Mok et al. | |
| 11,128,742 B2 | 9/2021 | Gorshe et al. | |
| 11,239,933 B2 | 2/2022 | Mok et al. | |
| 2001/0056512 A1 | 12/2001 | Mok et al. | |
| 2002/0158700 A1 | 10/2002 | Nemoto | |
| 2004/0082982 A1 | 4/2004 | Gord et al. | |
| 2005/0110524 A1 | 5/2005 | Glasser | |
| 2005/0182848 A1 | 8/2005 | Mcneil et al. | |
| 2006/0056560 A1 | 3/2006 | Aweya et al. | |
| 2006/0064716 A1 | 3/2006 | Sull et al. | |
| 2006/0076988 A1 | 4/2006 | Kessels et al. | |
| 2007/0036173 A1 | 2/2007 | McCrosky et al. | |
| 2007/0064834 A1 | 3/2007 | Yoshizawa | |
| 2007/0132259 A1 | 6/2007 | Ivannikov et al. | |
| 2008/0000176 A1 | 1/2008 | Mandelzys et al. | |
| 2008/0202805 A1 | 8/2008 | Mok et al. | |
| 2010/0052797 A1 | 3/2010 | Carley et al. | |
| 2010/0150271 A1 | 6/2010 | Brown et al. | |
| 2011/0095830 A1 | 4/2011 | Tsangaropoulos et al. | |
| 2012/0158990 A1 | 6/2012 | Losio et al. | |
| 2013/0101292 A1 | 4/2013 | Lanzone et al. | |
| 2014/0055179 A1 | 2/2014 | Gong et al. | |
| 2014/0139275 A1 | 5/2014 | Dally et al. | |
| 2014/0149821 A1 | 5/2014 | Zhou et al. | |
| 2015/0078406 A1 | 3/2015 | Caggioni et al. | |
| 2015/0117177 A1 | 4/2015 | Ganga et al. | |
| 2015/0288538 A1 | 10/2015 | Fritschi et al. | |
| 2016/0020872 A1 | 1/2016 | Zhong | |
| 2016/0127072 A1 | 5/2016 | Chen et al. | |
| 2016/0277030 A1 | 9/2016 | Burbano et al. | |
| 2016/0301669 A1 | 10/2016 | Muma et al. | |
| 2016/0315634 A1 | 10/2016 | Mei et al. | |
| 2016/0330014 A1 | 11/2016 | Jain | |
| 2017/0005949 A1 | 1/2017 | Gareau | |
| 2017/0171163 A1 | 6/2017 | Gareau et al. | |
| 2017/0244648 A1 | 8/2017 | Tse | |
| 2018/0131378 A1 | 5/2018 | Haroun et al. | |
| 2018/0145928 A1 | 5/2018 | Zhong et al. | |
| 2018/0159541 A1 | 6/2018 | Spijker | |

(56) References Cited

U.S. PATENT DOCUMENTS

| | | |
|---|---|---|
| 2018/0159785 A1 | 6/2018 | Wu et al. |
| 2018/0183708 A1 | 6/2018 | Farkas et al. |
| 2019/0097758 A1 | 3/2019 | Huang et al. |
| 2019/0173856 A1 | 6/2019 | Gareau et al. |
| 2019/0394309 A1 | 12/2019 | Caldwell et al. |
| 2020/0018794 A1 | 1/2020 | Uehara |
| 2020/0067827 A1 | 2/2020 | Mei et al. |
| 2020/0166912 A1 | 5/2020 | Schneider et al. |
| 2020/0287998 A1 | 9/2020 | Gorshe et al. |
| 2020/0295874 A1 | 9/2020 | Cheng et al. |
| 2020/0296486 A1 | 9/2020 | Xiang et al. |
| 2020/0396097 A1 | 12/2020 | Deng et al. |
| 2021/0385310 A1 | 12/2021 | Gorshe et al. |
| 2022/0407742 A1 | 12/2022 | Sergeev et al. |
| 2023/0006752 A1 | 1/2023 | Gorshe et al. |
| 2023/0006753 A1 | 1/2023 | Gorshe et al. |
| 2023/0006938 A1 | 1/2023 | Gorshe et al. |
| 2023/0163942 A1 | 5/2023 | Muma et al. |

FOREIGN PATENT DOCUMENTS

| | | |
|---|---|---|
| EP | 3544210 A1 | 9/2019 |
| KR | 101028593 B1 | 4/2011 |
| WO | 2003039061 A3 | 10/2003 |
| WO | 2020185247 A1 | 9/2020 |
| WO | 2021016696 A1 | 2/2021 |
| WO | 2021040762 A1 | 3/2021 |
| WO | 2021126309 A1 | 6/2021 |
| WO | 2021151187 A1 | 8/2021 |

OTHER PUBLICATIONS

"Interfaces for the metro transport network;g8312", ITU-T Draft; Study Period 2017-2020; Study Group 15; Series G8312, International Telecommunication Union, Geneva ; CH vol. 11/15, Nov. 25, 2020 (Nov. 25, 2020), pp. 1-21, XP044302831, Retrieved from the Internet: URL:https://www.itu.int/ifa/t/2017/sg15/exchange/wp3/qll/G.8312/g8312-IcCommentResolutions-v3.docx [retrieved on Nov. 25, 2020].

"IEEE 802.3 IEEE Standard for Ethernet Clause 82", IEEE, 2012.

"ITU-T Recommendation G.709 Interfaces for the Optical Transport Networks", ITU-T G.709/Y.1331, International Telecommunication Union, Jun. 2016.

"MEF 8 Implementation Agreement for the Emulation of PDH Circuits over Metro Ethernet Networks", Metro Ethernet Forum, Oct. 2004.

8A34003 Datasheet (Integrated Device Technology, Inc) Jun. 17, 2019 (Jun. 17, 2019).

Abdo Ahmad et al: "Low-Power Circuit for Measuring and Compensating Phase Interpolator Non-Linearity", 2019 IEEE 10th Annual Information Technology, Electronics and Mobile Communication Conference (IEMCON), IEEE, Oct. 17, 2019 (Oct. 17, 2019), pp. 310-313.

Eyal Oren Broadcom Limited USA, "MTN Section Layer frame and Path layer format considerations;C1522", ITU-T Draft; Study Period 2017-2020; Study Group 15; Series C1522, International Telecommunication Union, Geneva ; CH, Geneva ; CH, (Jun. 18, 2019), vol. 11/15, pp. 1-4, XP044270354.

ITU-T G.8013/Y.1731, "Operation, administration and maintenance (OAM) functions and mechanisms for Ethernet-based networks", International Telecommunication Union, Geneva, Switzerland, Aug. 2015.

Maarten Vissers, "FlexE aware mapping method 6B text proposal;CD11-I06", ITU-T Draft; Study Period 2013-2016, International Telecommunication Union, Geneva; CH, vol. 11/15, Jan. 12, 2016 (Jan. 12, 2016), pp. 1-3, Last paragraph of p. 2, p. 3, Figures 17-22.

Malcolm Johnson et al., "Optical Transport Networks from TDM to packet", ITU-T Manual 2010; ITU-T Draft; Study Period 2009-2012, International Telecommunication Union, Geneva, Switzerland, Feb. 22, 2011, pp. 91-122.

Qiwen Zhong, Huawei Technologies Co., Ltd. China, "Discussion and proposal for G.mtn terminologies regarding Ethernet client signal;WD11-39", ITU-T Draft; Study Period 2017-2020; Study Group 15; Series WD11-39, International Telecommunication Union, Geneva ; CH, Geneva ; CH, (Apr. 1, 2019), vol. 11/15, pp. 1-10, XP044264678.

Qiwen Zhong, Huawei Technologies Co., Ltd. P. R. China, "Analysis for IPG based G.mtn path layer OAM insertion impact on IEEE 802.3 PCS state machine;C1195", ITU-T Draft; Study Period 2017-2020; Study Group 15; Series C1195, International Telecommunication Union, Geneva ; CH, Geneva ; CH, (Jun. 18, 2019), vol. 11/15, pp. 1-6, XP044270155.

Steve Gorshe, "MTN Path Overhead Proposal—Overhead Frame Structure; WD11-13", ITU-T Draft; Study Period 2017-2020; Study Group 15; Series C1181, International Telecommunication Union, 3eneva; Switzerland, vol. 11/15 , Apr. 2, 2019.

Steve Gorshe, "MTN Path Overhead Proposal—Overhead Method and Frame Structure;CII81", ITU-T Draft; Study Period 2017-2020; Study Group 15; Series C1181, International Telecommunication Union, Geneva; Switzerland, vol. 11/15 , Jun. 18, 2019.

Steve Gorshe, Microsemi Corp. U.S.A., "Analysis of the G.mtn A.1 Scope Relative to IEEE 802.3 Clause 82 State Diagrams;C1179", ITU-T Draft; Study Period 2017-2020; Study Group 15; Series C1179, International Telecommunication Union, Geneva ; CH, Geneva ; CH, (Jun. 18, 2019), vol. 11/15, pp. 1-11, XP044270147.

Trowbridge, Steve, "G.mtn Section and Path Overhead Options," ITU-T WD11-10 Submission, International Telecommunication Union, Geneva, Switzerland, Apr. 2019.

Ximing Dong CICT P.R. China, "Feasibility Analysis: the Use of Idle as a Resources to Carry Path layer OAM; WD11-16", ITU-T Draft; Study Period 2017-2020; Study Group 15; Series WD11-16, International Telecommunication Union, Geneva ; CH, Geneva ; CH, (Apr. 1, 2019), vol. 11/15, pp. 1-6, XP044264659.

Zhang Sen et al, "Hybrid Multiplexing over FlexE Group," 2018 23rd Opto-Electronics and Communications Conference (OECC), IEEE, Jul. 2, 2018, p. 1-2.

Steve Trowbridge Nokia USA: "Sample common sub-IG TDM multiplexing and switching mechanism for use over MTN and OTN networks;C2812", ITU-T Draft; Study Period 2021-2024; Study Group 15; Series C2812, International Telecommunication Union, Geneva ; CH vol. 11/15, Nov. 23, 2021 (Nov. 23, 2021), pp. 1-7, XP044322271, Retrieved from the Internet: URL:https://www-api.itu.int/ifa/t/2017/sgl 5/docs/c/ties/T17-SG15-C-2812! !MSW-E.docx [retrieved on Nov. 23, 2021].

* cited by examiner

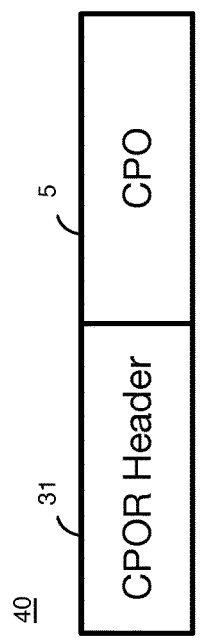
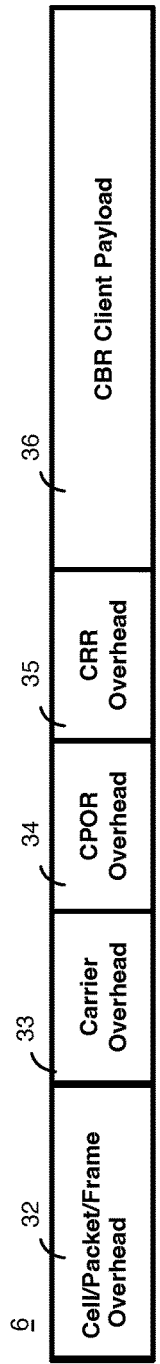
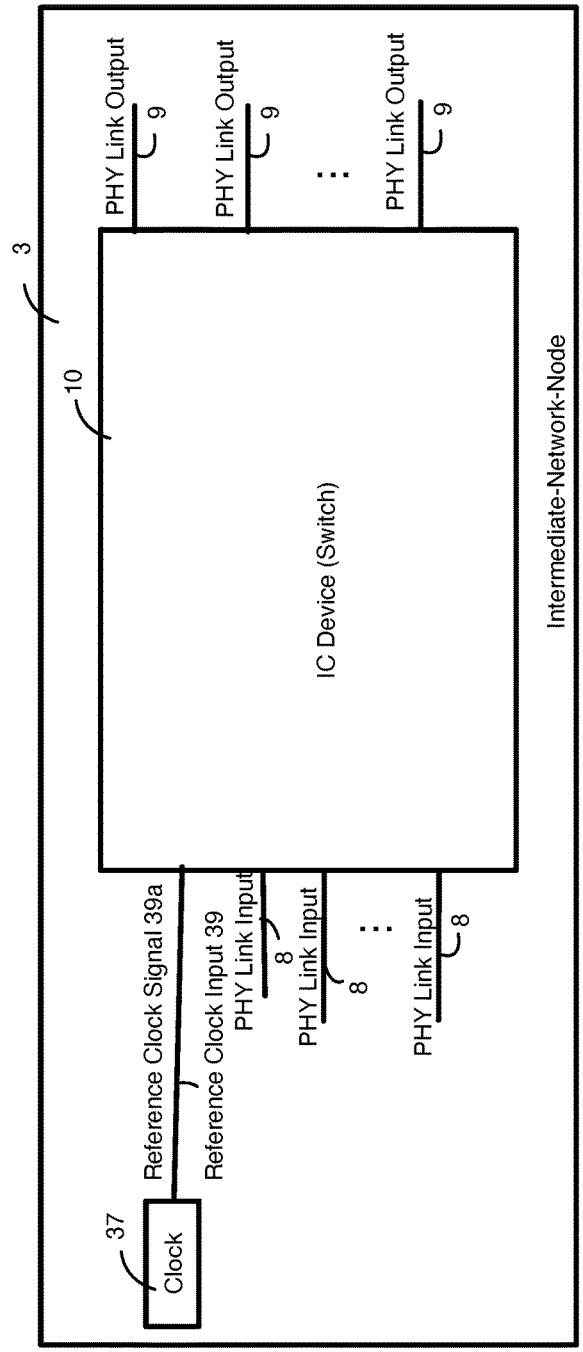

Calculate PSPO by calculating an IPSD that indicates the the increase in bit count within the Tps (e.g., by subtracting the previous CPSC from the current CPSC); and subtracting the LPSD from the IPSD, where the calculated PSPO is in units of phase and LPSD is a function of the Fipsck_nom and the Tps

FIG. 10B

Source node measures a bit rate for respective ones of the CBR clients in the CBR signal based on a local reference clock of the source node and encoding into respective ones of the CBR carrier streams a client rate report (CRR) that indicates the measured bit rate of the respective CBR client at the source node. None of the intermediate-network-nodes change the content of any of the CRRs. At source node receive the plurality of CBR signals, generate a CPOR that indicates an initial CPO, generate a CRR that indicates the measured bit rate of the respective CBR client, generate for respective ones of the CBR signals a corresponding CBR carrier stream and insert the CRR and CBR client data into the respective CBR carrier stream, insert the CPOR into a respective CBR carrier stream and multiplex the CBR carrier streams to generate a plurality of source data streams.

FIG. 10C

CPO is calculated by adding the calculated PSPO to the CPO-P

FIG. 10D

CPO is a function of all CPO-Ps received by the intermediate-network-node since a last initialization of the intermediate-network-node

FIG. 10E

CPO is an accumulated PSPO (ACPO) calculated by: calculating delta cumulative phase offset (D-CPO) by subtracting a previously received CPO-P from the CPO-P; calculating an accumulated D-CPO (ADCPO) by accumulating all D-CPO calculated by the intermediate network node since a last initialization of the intermediate-network-node; calculating an accumulated PSPO (APSPO) by accumulating all of the PSPO calculated by the intermediate-network-node since the last initialization of the intermediate-network-node; and adding APSPO to ADCPO)

FIG. 10F

CPO-S is calculated by adding the calculated PSPO-S to a CPO-P received at the sink node for the respective data stream

FIG. 10H

CPO is an accumulated CPO (ACPO) calculated by: calculating a delta cumulative phase offset (D-CPO) at the sink node by subtracting a previously received CPO-P received at the sink node from a CPO-P received at the sink node; calculating a sink accumulated D-CPO (ADCPO-S) by accumulating all of the D-CPO calculated by the sink node since a last initialization of the sink node; calculating a sink accumulated PSPO (APSPO-S) by accumulating all of the PSPO calculated by the sink node since a last initialization of the sink node; and adding the APSPO-S to the ADCPO-S.

101a Receive a data stream generated by a previous network node. The received data stream includes constant bit rate (CBR) carrier streams, at least one of which comprises frames (e.g., CBR carrier stream frames). Respective CBR carrier streams correspond to CBR signals received at a source node.

102a Sample a counter accumulating a PHY-scaled stream clock (IPSCk) at a nominal sampling period (Tps) of a local reference clock of the intermediate-network-node to obtain a cumulative PHY-scaled count (CPSC) of the received respective data stream, the IPSCk generated by scaling a clock recovered from the received respective data stream to a predetermined nominal bit rate frequency (Fipsck_nom) (at least one of the respective individual CBR carrier streams comprises frames)

103a Calculate a PHY-scaled stream phase offset (PSPO) that indicates the phase difference between a PHY-scaled stream nominal bit count (LPSD) and an incoming PHY-scaled count delta (IPSD), where the IPSD represents an increment between successive CPSCs (at least one of the respective individual CBR carrier streams comprises frames)

104a Demultiplex the received data stream to obtain the CBR carrier streams, respective ones of the CBR carrier streams including a previous network node cumulative phase offset report (CPOR-P) that indicates a previous network node cumulative phase offset (CPO-P) (at least one of the respective individual CBR carrier streams comprises frames)

105a Calculating a cumulative phase offset (CPO) for respective ones of the CBR carrier streams that is a function of the CPO-P for the respective CBR carrier stream and the calculated PSPO (at least one of the respective individual CBR carrier streams comprises frames)

106a Replacing CPO-P in respective ones of the CBR carrier streams with the calculated CPO for the respective CBR carrier stream, or a function of the calculated CPO for the respective CBR carrier stream to generate an updated CPOR in place of the CPOR-P in the respective CBR carrier stream (at least one of the respective individual CBR carrier streams comprises frames)

107a Multiplexing the CBR carrier streams into intermediate-network-node data streams (at least one of the respective individual CBR carrier streams comprises frames)

108a Transmit the intermediate-network-node data streams from the particular intermediate network node (at least one of the respective individual CBR carrier streams comprises frames)

FIG. 12

METHOD AND APPARATUS FOR CARRYING CONSTANT BIT RATE (CBR) CLIENT SIGNALS USING CBR CARRIER STREAMS COMPRISING FRAMES

CROSS-REFERENCE TO RELATED APPLICATIONS

The present application claims priority to U.S. Provisional Patent Application Ser. No. 63/282,292 filed on Nov. 23, 2021, and is a continuation-in-part of U.S. Non-Provisional patent application Ser. No. 17/885,194 filed on Aug. 10, 2022, the contents of each of which are incorporated by reference herein in their entirety.

BACKGROUND OF THE INVENTION

There are three primary classes of methods to transport a Constant Bit Rate (CBR) client over a cell/packet/frame transport network. The first is purely adaptive where the sink node monitors the rate of arrival of cells/packets/frames carrying the CBR client and adjusts its transmit phase lock loop (TxPLL) accordingly, to speed up or slow down. The sink node often implements a FIFO buffer to hold the CBR client and uses its depth to control the transmit phase locked loop. This scheme is susceptible to delay variations encountered by the CBR client in the transport network. For example, a decrease in delay would appear to the sink node as a faster arrival rate, and therefore the transmit phase locked loop may speed up spuriously.

In the second class of methods, the source node inserts a timestamp based on the arrival times of certain key bits of the CBR client. The timestamps and the CBR client data are bound into a carrier stream. The bit rate of the CBR client is computed by dividing the number of CBR client bits between successive timestamps and the change in timestamp values. This method is exemplified by IETF RFC 4553 SAToP which requires that the source and sink nodes share a common clock reference. However, requiring a common clock reference at source and sink nodes increases the deployment cost of the transport network. Moreover, the addition of a common clock reference is not feasible in some situations.

The third class of methods, exemplified by the International Telecommunication Union (ITU) Generic Mapping Procedure (GMP), introduces low jitter and wander into the CBR client and does not require a common reference clock. It involves inserting a client rate report, such as a GMP overhead, periodically into the carrier stream of the CBR client at the source node. At the input of an intermediate switching node, the rate report is processed to recover the bit rate of each CBR client. At the output of the intermediate node, the bit rate of respective ones of the CBR clients is re-encoded into a new rate report in relation to the bit rate of the egress carrier stream of the intermediate node. This scheme can be expensive and complex to implement when the number of CBR clients at an intermediates node is very large, because respective ones of the CBR clients requires its own rate report digital signal processor (DSP) engine.

Accordingly, there is a need for a method and apparatus that will allow for conveying CBR client signals without requiring processing and re-generating a new rate report for respective ones of the CBR clients at intermediate nodes. Furthermore, there is a need for a method and apparatus that does not require that source and sink nodes share a common reference clock.

SUMMARY OF THE INVENTION

A method is disclosed that includes receiving, at respective ones of a plurality of intermediate-network-nodes, a respective data stream generated by a previous network node. The respective data stream includes a constant bit rate (CBR) carrier stream corresponding to constant bit rate (CBR) signals received at a source node. In one example, the received respective data stream generated by the previous network node includes CBR carrier streams, at least one of which comprises frames, respective CBR carrier streams corresponding to CBR signals received at a source node. A counter accumulating a PHY-scaled stream clock (IPSCk) is sampled at a nominal sampling period (Tps) of a local reference clock of the intermediate-network-node to obtain a cumulative PHY-scaled count (CPSC) of the received respective data stream. IPSCk is generated by scaling a clock recovered from the received respective data stream to a predetermined nominal frequency (Fipsck_nom). The method includes calculating a PHY-scaled stream phase offset (PSPO) that indicates the phase difference between a PHY-scaled stream nominal bit count (LPSD) and an incoming PHY-scaled count delta (IPSD), where the IPSD represents an increment between successive CPSCs.

The received respective data stream is demultiplexed to obtain the CBR carrier streams. Respective ones of the CBR carrier streams include a previous network node cumulative phase offset report (CPOR-P) that indicates a previous network node cumulative phase offset (CPO-P) and a client rate report (CRR) that indicates a measured bit count of the respective CBR client at the source node. A cumulative phase offset (CPO) is calculated for respective ones of the CBR carrier streams. The calculated CPO is a function of the CPO-P for the respective CBR carrier stream and the calculated PSPO. CPO-P in respective ones of the CBR carrier streams is replaced with the calculated CPO for the respective CBR carrier stream, or a function of the calculated CPO for the respective CBR carrier stream to generate an updated cumulative phase offset report (CPOR) in place of the CPOR-P in the respective CBR carrier stream. The respective CBR carrier streams are multiplexed into the intermediate-network-node data streams. The intermediate-network-node data streams are then transmitted from the particular intermediate-network-node.

An integrated circuit (IC) device includes a PHY link input to receive a data stream generated by a previous network node that includes a plurality of CBR carrier streams, at least one of which comprises frames, respective ones of the CBR carrier streams including a CPOR-P that indicates a CPO-P and a CRR that indicates a measured bit count of the respective CBR client at the source node. A clock offset circuit is coupled to the PHY link input to sample a counter accumulating IPSCk at a Tps of a local reference clock of the intermediate-network-node to obtain a CPSC of the received respective data stream, the IPSCk generated by scaling a clock recovered from the received respective data stream to Fipsck_nom, and calculate a PSPO that indicates the phase difference between an LPSD and an IPSD, where the IPSD indicates the CPSC increment between successive CPSC samples. A demultiplexer is coupled to the PHY link input to demultiplex the received data stream to obtain the plurality of CBR carrier streams. Cumulative phase offset report (CPOR) update logic is coupled to the demultiplexer and the clock offset circuit to calculate a CPO for respective ones of the CBR carrier streams, wherein the calculated CPO is a function of the CPO-P and the calculated PSPO, and to replace the CPO-P with the calculated CPO for the respective CBR carrier stream, or a function of the calculated CPO for the respective CBR carrier stream, and to generate an updated CPOR for the respective CBR carrier stream in place of the CPOR-P in the respective CBR carrier stream. A multiplexer is coupled to the demultiplexer and the CPOR update logic to multiplex the CBR carrier streams into a plurality of intermediate-network-node data streams. Encoders are coupled to the multiplexer to encode the plurality of intermediate-network-node data streams. PHY link outputs are coupled to the encoders to transmit the plurality of intermediate-network-node data streams from the IC device.

A network includes a source node that includes: an input to receive a plurality of CBR signals, a CPOR generating circuit to generate a CPOR that indicates an initial CPO, a CRR generating circuit to generate a CRR that indicates the measured bit rate of the respective CBR client, a CBR mapper coupled to the input to generate for respective ones of the CBR signals a corresponding CBR carrier stream comprising frames and to insert the CRR and CBR client data into the respective CBR carrier stream, and a source output processing circuit to insert the CPOR into the respective CBR carrier stream and multiplex the CBR carrier streams to generate a plurality of source data streams.

The network includes a plurality of intermediate-network-nodes coupled to the source node, respective ones of the intermediate-network-nodes including an IC device that includes: a PHY link input to receive a data stream generated by a previous network node that includes a plurality of CBR carrier streams, at least one of which comprises frames, respective ones of the CBR carrier streams including a CPOR-P that indicates a CPO-P and the CRR.

The intermediate-network-nodes include a clock offset circuit coupled to the PHY link input to: sample a counter accumulating an IPSCk at a Tps of a local reference clock of the intermediate-network-node to obtain a CPSC of the received respective data stream, the IPSCk generated by scaling a clock recovered from the received respective data stream to a Fipsck_nom, and calculate a PHY-scaled stream phase offset (PSPO) that indicates the phase difference between an LPSD and an IPSD, where the IPSD indicates the increment between successive CPSCs.

The intermediate-network-nodes include a demultiplexer coupled to the PHY link input to demultiplex the received data stream to obtain the individual CBR carrier streams, and a CPOR update logic coupled to the demultiplexer and the clock offset circuit. The CPOR update logic is to calculate a CPO for respective ones of the CBR carrier streams, wherein the calculated CPO is a function of the CPO-P for the particular CBR carrier stream and the calculated PSPO, and to replace the CPO-P for the particular CBR carrier stream with the calculated CPO for the respective CBR carrier stream to generate an updated CPOR for the respective CBR carrier stream in place of the CPOR-P for the particular CBR carrier stream.

The intermediate-network-nodes include a multiplexer coupled to the demultiplexer and the CPOR update logic to multiplex the CBR carrier streams into a plurality of intermediate-network-node data streams, encoders coupled to the multiplexer to encode the plurality of intermediate-network-node data streams, and PHY link outputs coupled to the encoders to transmit the plurality of intermediate-network-node data streams from the IC device.

The network includes a sink node coupled to a last one of the intermediate-network-nodes to receive an intermediate-network-node data stream from a last one of the intermediate-network-nodes, recover CBR client signals; and output from the sink node a CBR signal that includes the recovered CBR client signals. In one example the intermediate-network-node data stream from the last intermediate-network-node that is received at the sink node includes CBR carrier streams, at least one of which comprises frames. In this example the method further includes: receiving the intermediate-network-node data stream from the last intermediate-network-node at the sink node, the received intermediate-network-node data stream including CBR carrier streams, at least one of which comprises frames.

The disclosed method and apparatus allow for conveying CBR client signals without requiring processing and re-generating a new rate report for respective ones of the CBR clients at intermediate-network-nodes. Furthermore, the present method and apparatus does not require that source and sink nodes share a common reference clock.

BRIEF DESCRIPTION OF THE DRAWINGS

The accompanying drawings are included to provide a further understanding of the invention, and are incorporated in, and constitute a part of, this specification. The drawings illustrate various examples. The drawings referred to in this brief description are not drawn to scale.

FIG. 3 is a block diagram illustrating a CPOR.

FIG. 4 is a block diagram illustrating a data stream.

FIG. 5 is a block diagram illustrating an intermediate-network-node switch of the network of FIG. 1.

FIG. 10B-10I are block diagrams illustrating examples for performing portions of the method of FIG. 10A.

FIG. 12 is a flow diagram illustrating a method for coupling CBR signals over a network in which at least one of the respective individual CBR carrier streams comprises frames.

DETAILED DESCRIPTION

Figure 1:
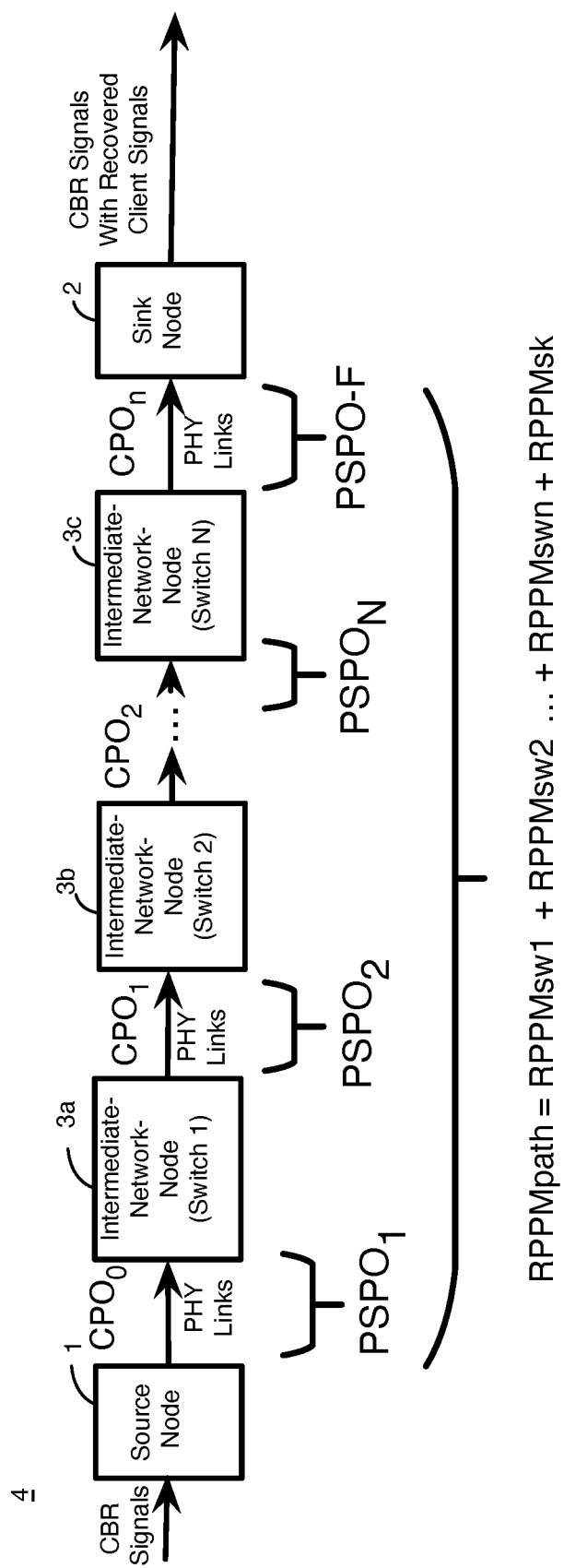
FIG. 1 is a diagram illustrating a network that includes a source node, a sink node and a plurality of intermediate-network-nodes.

FIG. 1 shows an example of a network 4 that includes a source node 1, a sink node 2 and a plurality of intermediate-network-nodes 3, illustrated in FIG. 1 as first intermediate-network-node 3a, second intermediate-network-node 3b and last intermediate-network-node 3c, which intermediate-network-nodes 3 extend logically between source node 1 and sink node 2 to couple source node 1 to sink node 2. The respective intermediate-network-nodes may be implemented as switches. The relative parts per million frequency offset (RPPM) between the reference clock of the source and sink nodes (RPPMpath) can be represented by the equation:

RPPMpath=RPPMsw1+RPPMsw2+RPPMswn+RPPMsk where RPPMsw1 is the RPPM between the reference clocks of intermediate-network-node 3*a* and source node 1 and is measured at the first intermediate-network-node 3*a*, RPPMsw2 is the RPPM between the reference clocks of intermediate-network-node 3*b* and intermediate-network-node 3*a* and is measured at the second intermediate-network-node 3*b*, RPPMswn is the RPPM between the reference clocks of intermediate-network-node node 3*c* and its upstream node and is measured at the $n^{th}$ intermediate-network-node 3*c*, and RPPMsk is the RPPM between the reference clocks of the immediate preceding intermediate-network-node (e.g. intermediate-network-node 3*c*) and the sink node 2, measured at sink node 2.

Figure 2:
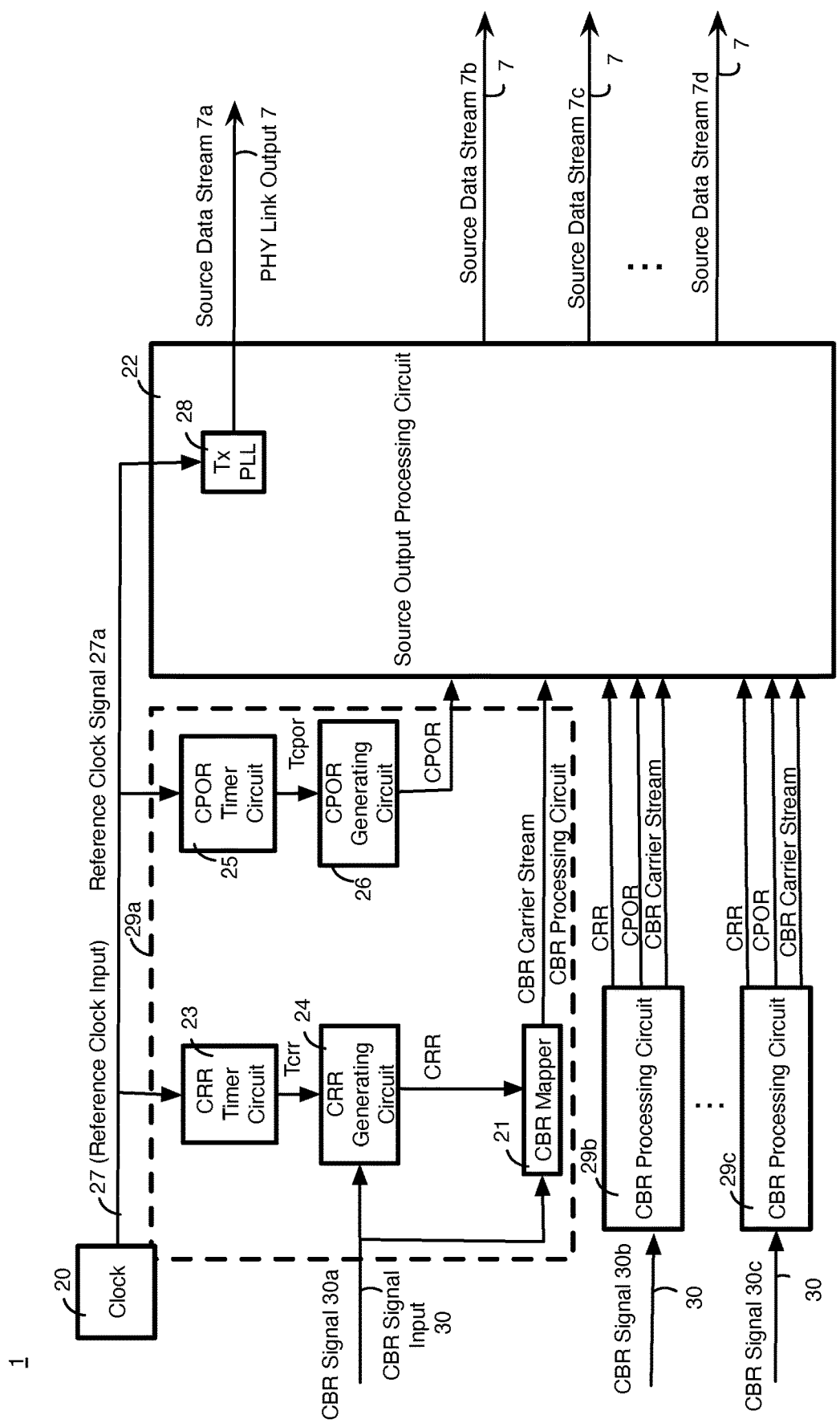
FIG. 2 is a diagram illustrating circuits of a source node.

FIG. 2 shows an example source node 1 that includes local reference clock 20, reference clock input 27, a plurality of CBR processing circuits 29*a*-29*c*, source output processing circuit 22 that includes a transmit PLL 28, CBR signal inputs 30 and PHY link outputs 7. Respective ones of CBR processing circuits 29*a*-29*c* includes a CRR timer circuit 23, a CRR generating circuit 24, a CPOR timer circuit 25, a CPOR generating circuit 26 and a CBR mapper 21. The CRR generating circuit 24 may be implemented using a Digital Signal Processor (DSP).

Respective ones of CPOR processing circuits 29*a*-29*c* are coupled to reference clock input 27, respective CBR signal inputs 30 for receiving respective CBR signals, e.g., CBR signals 30*a*, 30*b*, 30*c*, and to source output processing circuit 22. CRR generating circuit 24 is coupled to CRR timer circuit 23 and to CBR mapper 21. CPOR generating circuit 26 is coupled to CPOR timer circuit 25 and source output processing circuit 22. Respective ones of CBR mappers 21 are coupled to a respective CBR signal input (e.g., one of CBR signal inputs 30) and to source output processing circuit 22. Source output processing circuit 22 is coupled to PHY link outputs 7.

Reference clock input 27 is coupled to local reference clock 20 of source node 1 to supply a reference clock signal 27*a* to CRR timer circuit 23 of the respective CBR processing circuits 29, CPOR timer circuit 25 of the respective CBR processing circuits 29 and transmit phase locked loop 28.

CPOR timer circuit 25 receives the reference clock signal 27*a* on reference clock input 27 and generates a timing signal Tcpor. CPOR generating circuit 26 receives timing signal Tcpor and generates a CPOR responsive to the received timing signal Tcpor. CRR timer circuit 23 receives the reference clock signal 27*a* and generates a timing signal Tcrr. CRR generating circuit 24 receives the respective CBR signal 30*a*-30*c* at a respective CBR signal input 30 and uses the received CBR signal 30*a*-30*c* and received timing signal Tcrr to generate a CRR that indicates the measured clock rate of the respective CBR client. The generation period of CRR (responsive to timing signal Tcrr) and CPOR (responsive to timing signal Tcpor) can be independent.

FIG. 3 shows an example of a CPOR 40 generated by CPOR generating circuit 26 that includes a CPOR header 31 and a CPO 5. The term "CPO" as used in the present application is one or more value or word that indicates a cumulative phase offset. In the present example, it is a single numerical value indicated in bits, bytes or words of phase offset. The term "CPOR" as used in the present application is a sequence of characters that indicates a CPO. The CPO output by CPOR generating circuit 26 can be referred to as an "initial CPO." In the present example, the initial CPO is not calculated at the source node, but rather is set to a predetermined value such as, for example, "0", responsive to the received timing signal Tcpor.

CBR mapper 21 of FIG. 2 receives a respective CBR signal 30*a*-30*c* and CRRs from CRR generating circuit 24 and generates a corresponding CBR carrier stream that is coupled to source output processing circuit 22. CBR mapper 21 uses the information in the CRRs to format CBR client data into the CBR carrier stream and inserts the CRR and CBR client data into the respective CBR carrier stream. Source output processing circuit 22 inserts the CPOR into the respective CBR carrier stream and multiplexes the CBR carrier streams to generate a plurality of source data streams 7*a*-7*d* that are respectively output over PHY link outputs 7. Transmit phase locked loop (PLL) 28 receives as input the reference clock signal 27*a* and generates timing signals that control the timing of the output of source data streams 7*a*-7*d*. PHY link outputs 7 are phase locked to the local reference clock 20 by transmit PLL 28.

FIG. 4 shows an example of a data stream cell, packet or frame 6 that includes overhead 32, carrier overhead 33, CPOR overhead 34, CRR overhead 35 and CBR client payload 36. When data stream cell, packet or frame 6 is a cell, overhead 32 is cell overhead; when data stream cell, packet or frame 6 is a packet, overhead 32 is packet overhead; and when data stream cell, packet or frame 6 is a frame, overhead 32 is frame overhead. CRR overhead 35 consists of CRRs generated by CRR generating circuit 24 (e.g., the CRR's generated for the particular data stream). When data stream cell, packet or frame 6 exits as the source data stream 7*a*-7*d* of FIG. 2, CPOR overhead 34 consists of CPORs 40 generated by CPOR generating circuit 26 such that the CRR and CPOR are carried inband with the CBR client payload in the source data streams 7*a*-7*d* that are output. In the present example, to be robust against burst errors, CRR and CPOR in data stream cell, packet or frame 6 can be distributed over multiple cells, packets or frames.

FIG. 5 illustrates an example intermediate-network-node 3 that includes an integrated circuit (IC) device 10 and a local reference clock 37. IC device 10 is coupled to local reference clock 37 by a reference clock input 39, and includes PHY link inputs 8 and PHY link outputs 9. IC device 10 may implement a switch, and in that example intermediate-network-node 3 may be an intermediate-network-node switch. There is no requirement for local reference clock 37 of intermediate-network-node 3 to be phase locked to the local reference clock of other intermediate network nodes 3, to the local reference clock 20 of source node 1, or to the local reference clock 39*a*-1 of the sink node.

Figure 6:
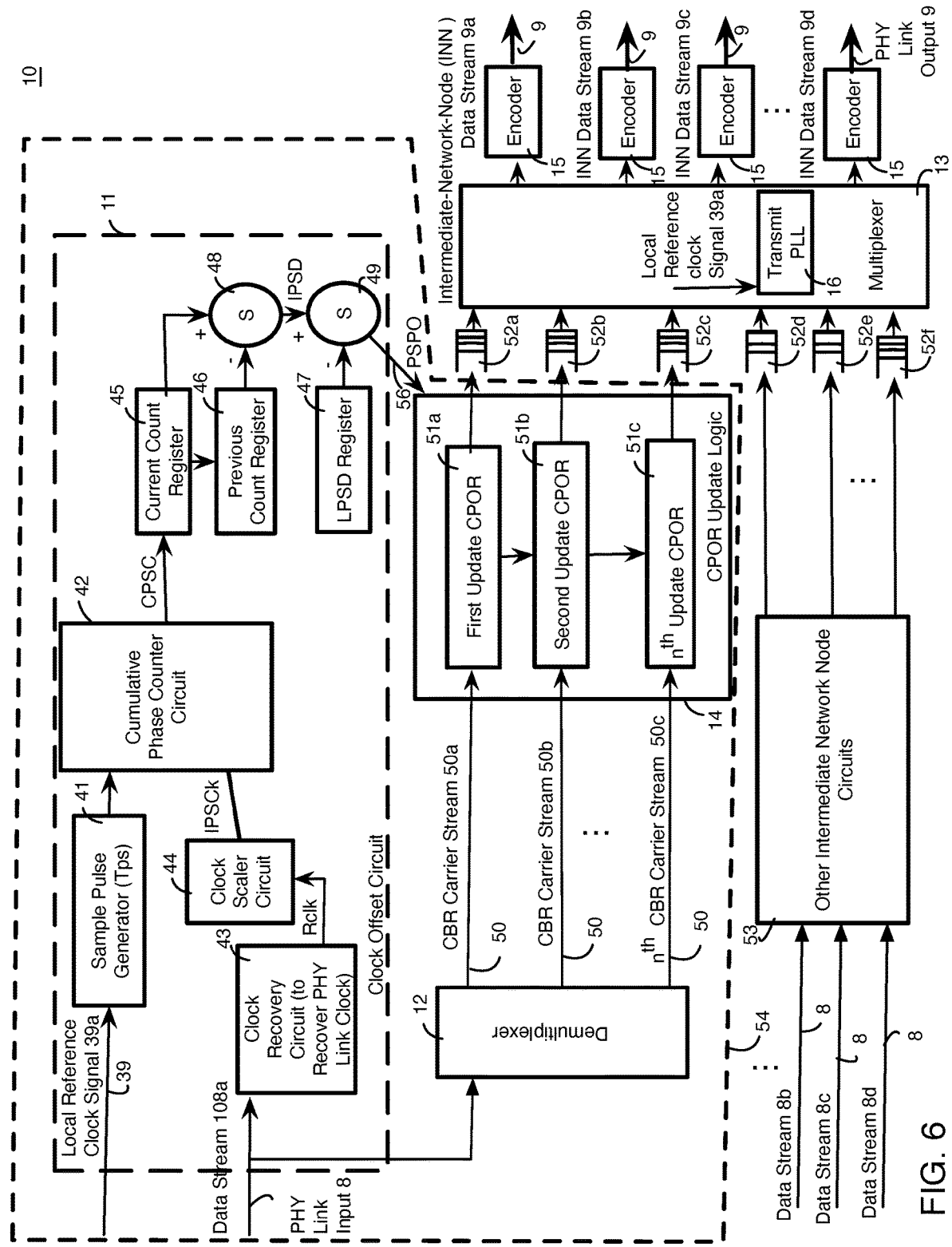
FIG. 6 is a diagram illustrating an IC device (switch) of the intermediate-network-node switch shown in FIG. 5.

FIG. 6 shows an example of an IC device 10 (e.g., a "switch") that includes reference clock input 39, PHY link inputs 8 for receiving a respective data stream, clock offset circuit 11, demultiplexer 12, multiplexer 13, CPOR update logic 14, FIFO registers 52*a*-52*f,* other intermediate-network-node circuits 53, encoders 15 and PHY link outputs 9. Clock offset circuit 11 is coupled to CPOR update logic 14, reference clock input 39 and a PHY link input 8. Demultiplexer 12 is coupled to a PHY link input 8 and CPOR update logic 14. CPOR update logic 14 is coupled to first-in-first-out (FIFO) registers 52*a*-52*c* such that respective ones of the CBR carrier streams are coupled to a respective one of FIFO's 52*a*-52*c*. More particularly, first CBR carrier stream 50*a* is coupled to FIFO 52*a*, second CBR carrier stream 50*b* is coupled to FIFO 52*b* and 3rd CBR carrier stream 50*c* is coupled to FIFO 52c, it being understood that there may be n CBR carrier streams with n respective FIFOs. Multiplexer 13 includes one or more transmit PLL 16 and is coupled to FIFO's 52a-52f and encoders 15. Respective ones of encoders 15 couple to a respective one of PHY link outputs 9. Transmit PLL 16 receives as input a local reference clock signal 39a at reference clock input 39 and generates timing signals that control the timing of the output of Intermediate-network-node (INN) data streams 9a-9d. Clock offset circuit 11 includes sample pulse generator 41, cumulative phase counter circuit 42, clock recovery circuit 43, clock scaler circuit 44, current count register 45, previous count register 46, first subtraction logic 48, second subtraction logic 49 and LPSD register 47. Sample pulse generator 41 is coupled to reference clock input 39 and cumulative phase counter circuit 42. Clock recovery circuit 43 is coupled to a respective PHY link input 8, and to clock scaler circuit 44. Cumulative phase counter circuit 42 is coupled to current count register 45 and clock scaler circuit 44. Current count register 45 is coupled to previous count register 46. First subtraction logic 48 is coupled to current count register 45, previous count register 46 and to second subtraction logic 49. Second subtraction logic 49 is coupled to LPSD register 47 and to CPOR update logic 14. First subtraction logic 48 and second subtraction logic 49 may be implemented as respective subtraction circuits.

In the present example IC device 10 is formed on a single integrated circuit die and does not include a respective DSP engine for each CBR client. PHY link inputs 8, the clock offset circuit 11, the demultiplexer 12, the CPOR update logic 14, the encoders 15 and the PHY link outputs 9 can be disposed in the single integrated circuit die.

The circuits for demultiplexing and updating CPOR for a data stream received at a first PHY link input 8 are shown in dashed line 54 in FIG. 6. Other intermediate-network-node circuits 53 can include the same circuits 54 for demultiplexing and updating CPOR for data streams 8b-8d received at other PHY link inputs 8, and for coupling other carrier streams having updated CPORs to respective FIFOs 52d-52f.

Respective ones (e.g., each) of PHY link inputs 8 receive a data stream generated by a previous network node, illustrated as data streams 8a-8d (e.g., one of source data streams 7a-7d or an INN data stream 9a-9d from a previous intermediate-network-node). Sample pulse generator 41 receives the local reference clock signal 39a at reference clock input 39 and generates sample pulses at a sampling period Tps using the local reference clock signal 39a. The nominal period of the sample pulses is a constant across all nodes in network 4, with the actual deviation in period dependent on the actual ppm offset of the respective local reference clock signal 39a. The sampling period of the cumulative phase counter circuit 42 (i.e., Tps) is chosen to be longer than Tcpor of FIG. 2. In one example, Tps>2*Tcpor.

Clock recovery circuit 43 receives the data stream 8a from the previous network node at the respective PHY link input 8 and recovers the PHY link clock signal (i.e., the clock of data stream 8a). The recovered PHY-link clock signal (Rclk) is output to clock scaler circuit 44. The sequence of data bits in data stream 8a received at clock recovery circuit 43 is not relevant to the operation of clock offset circuit 11 and can be discarded at clock offset circuit 11.

Clock scalar circuit 44 scales the Rclk to generate a PHY-scaled stream clock (IPSCk). In one example, the nominal clock rate of the PHY link (PHYck-nom) is used to determine the scaling factor. The term "nominal clock rate of the PHY link" as used in the present application is a value, and may be a value that indicates the clock rate, i.e., the bit rate, that PHY-link inputs 8 are designed to operate at, or a value that indicates the rate that a PHY-link (not shown) that couples to a PHY link inputs 8 is designed to operate at such as 10 Gbit/second or 25 Gbit/second. In one example, the scaling factor in 44 is set to (PHYck-nom/Fipsck_nom), where Fipsck_nom is a predetermined nominal frequency. Accordingly, the rate of IPSCk=Rclk*(Fipsck_nom/PHYck-nom). Thus, the nominal clock rate of IPSCk is constant over the entire network 4 (all intermediate-network-nodes and the sink node). Fipsck_nom is a constant, defined across all nodes in the transport network, and is chosen to provide a simple scalar ratio between PHY link clock rates in the network 4. For example, the Fipsck_nom in network 4 may be set to 1.0 MHz or 10 MHz. In one example Fipsck_nom represents the nominal rate of IPSCk and is the nominal clock frequency of all "PHY-scaled stream clocks" in the network, where the clock recovery circuit 43 and clock scaler circuit 44 of each clock offset circuit 11 in the network 4 is considered to constitute a "PHY-scaled stream clock" of the network, without limitation. In one example a value 1 MHz is used as Fipsck_nom to perform the scaling in all intermediate-network-nodes of the network and in the sink node. In this example, the Rclk is divided by the scaling factor in 44 to generate IPSCk. It is appreciated that the present use of 1 MHz as the nominal Fipsck_nom is only a single example, and that other values could also be used.

A counter (i.e., a cumulative phase counter) of cumulative phase counter circuit 42 accumulating IPSCk is sampled by cumulative phase counter circuit 42 based on the local reference clock signal 39a provided by local reference clock 37 at a period of Tps to obtain a CPSC of the received respective data stream. In one example, cumulative phase counter circuit 42 accumulate the edges of IPSCk into a free running counter to generate CPSC. Logically, the counter can go to infinity. In this example the counter of cumulative phase counter circuit 42 is sampled at every pulse (once per Tps) received from sample pulse generator 41 to obtain the CPSC of the received respective data stream. In one example cumulative phase counter circuit 42 increments by 1 at every IPSCk clock edge and the value of the counter in cumulative phase counter circuit 44 is sampled once at each Tps to identify the current bit count that comprises CPSC. The current CPSC output by cumulative phase counter circuit 42 at Tps is stored in current count register 45. When a new CPSC is output, responsive to the next pulse from sample pulse generator 41, i.e., after Tps, the previous CPSC is stored in previous count register 46 prior to storing the new CPSC in current count register 45 (e.g., by moving the CPSC stored in current count register 45 to previous count register 46). Thereby the current CPSC and the previous CPSC output from cumulative phase counter circuit 42 are stored in registers 45-46.

In one example the counter in cumulative phase counter circuit 42 is not cleared. It is merely sampled at Tps instances. The previous sampled value is subtracted from the current sampled value to produce an effect similar to clearing at every Tps, but it is not sensitive to a clearing signal lining up closely with IPSCk which increments the counter.

In the present example, the CPSC generated by cumulative phase counter circuit 42 indicates phase using bits (bit count). Bits (bit count) is a convenient unit of measurement, with the amount of phase delivered by an upstream node being a monotonically rising value that goes on to infinity, in terms of bits, bytes, or radians, without limitation. In alternate embodiments bytes, radians or other measurements could be used by cumulative phase counter circuit 42 to identify the actual delivery of phase, against Tps, as determined by the local reference clock signal 39*a*. In an alternate example, the bit rate could be used. However, that may involve one or more division step, and therefore may not as efficient as staying in the count domain.

The clock offset circuit 11 calculates a PSPO that indicates the phase difference between a PHY-scaled stream nominal bit count (LPSD) and an incoming PHY-scaled count delta (IPSD). The term "PHY-scaled stream nominal bit count," as used in the present application, that may also be referred to as a "local PHY-stream delta" or "LPSD" is a value that indicates a local constant increment in phase count over a period of time, and may be a function Tps and Fipsck_nom. LPSD represents the expected amount of increment at the intermediate-network-node based on Fipsck_nom and Tps. In the present example, an LPSD that is a function of Fipsck_nom and Tps is stored in LPSD register 47. In one example, LPSD is computed from the product of Fipsck_nom and the Tps, using the equation: LPSD=Fipsck_nom*Tps. As indicated above, the LPSD is stored in LPSD register 47. Logically, Tcrr of FIG. 2 can be expressed in terms of the number of PHY-scaled stream bits (Ncrr) using the relation Ncrr=Tcrr*Fipsck_nom.

First subtraction logic 48 subtracts the previous CPSC in register 46 from the current CPSC in register 45 to obtain IPSD. Since IPSD represents a CPSC increment between successive CPSCs as sampled by cumulative phase counter circuit 42 (i.e., indicates the increment in the CPSC count within a Tps period) it indicates the increment in accumulated phase (bit count) within a Tps.

Second subtraction logic 49 subtracts LPSD from IPSD to calculate the PHY-scaled stream phase offset (PSPO). Accordingly, PSPO=(IPSD-LPSD) such that PSPO captures the relative parts-per-million (PPM) offset (RPPM) between the reference clock at the upstream node used to generate the data stream 8*a* and the local reference clock 37, encoded in units of phase. Using units of phase is superior to units of frequency as it allows the sink node to be phase locked to the source node more easily. Using units of frequency would only allow frequency lock.

In one example PHY link is a 10 Gbit/s link such that its clock rate is nominally 10,000,000,000 cycles/second and Fipsck_nom is 1 MHz giving an IPSCk=Rclk*(1,000,000/10,000,000,000)=Rclk/10,000 that is sampled at Tps and LPSD=1,000,000*Tps. Accordingly, the resulting PSPO will capture the difference between what is expected (LPSD) and what is calculated/measured (IPSD) in units of phase.

Demultiplexer 12 demultiplexes the received data stream 8*a* to obtain the individual CBR carrier streams 50*a*-50*c*, and outputs a first CBR carrier stream 50*a* at a respective demultiplexer output 50 that couples to CPOR update logic 14, outputs a second CBR carrier stream 50*b* at a respective demultiplexer output 50 that couples to CPOR update logic 14 and so forth to a 3rd CBR carrier stream 50*c* output at a respective demultiplexer output 50 that couples to CPOR update logic 14. While 3 CBR carrier stream outputs are shown, n CBR carrier streams may be output at n respective demultiplexer outputs 50.

Respective ones of the CBR carrier streams 50*a*-50*c* (e.g., each of CBR carrier streams 50*a*-50*c*) include a CRR that indicates a measured bit count of the respective CBR client at the source node and a CPOR-P that indicates a CPO-P, i.e., a CPO of a previous node. A CPO is calculated for respective ones of the CBR carrier streams (e.g., each of CBR carrier streams 50*a*-50*c*) and CPO-P for respective ones of the CBR carrier streams 50*a*-50*c* is replaced with the calculated CPO for the respective CBR carrier stream, where the calculated CPO is a function of the CPO-P for the particular carrier stream and the calculated PSPO.

Figure 7:
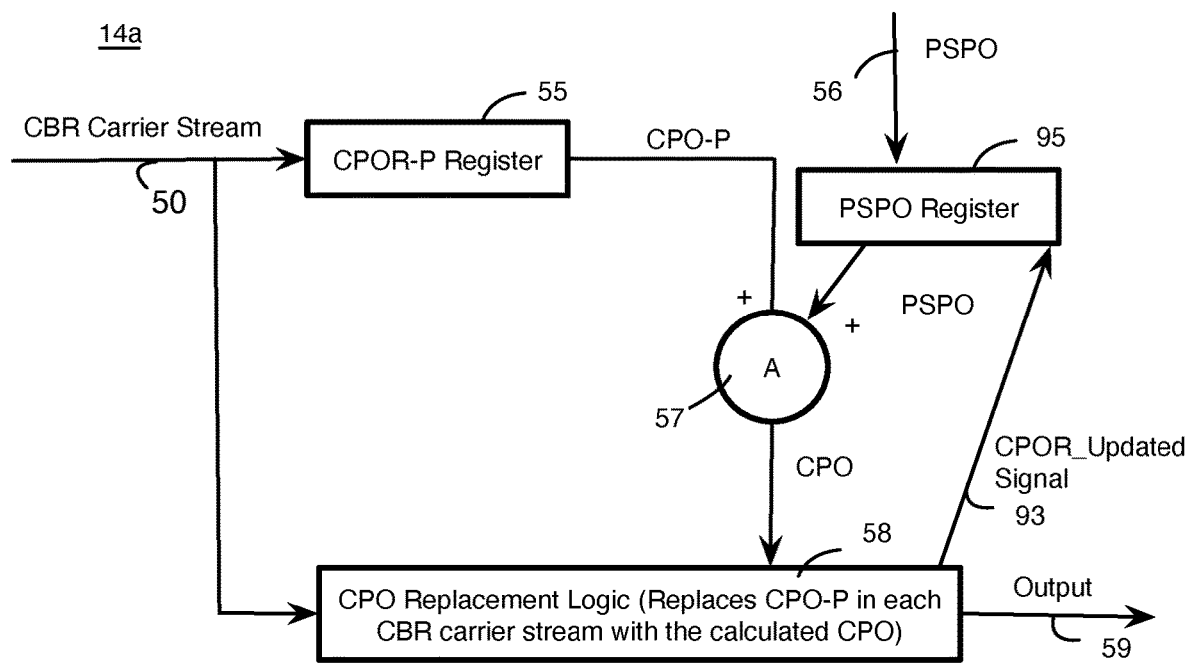
FIG. 7 is a diagram showing an example of CPOR update logic that calculates CPO by adding CPO-P to the calculated PSPO.

In FIG. 7, an example of CPOR update logic 14 is shown as CPOR update logic 14*a*, that includes a CPOR-P register 55, PSPO register 95 (e.g., a self-clearing register), an adder circuit 57, CPO replacement logic 58 and an output 59 coupled to a respective one of FIFO's 52*a*-52*c*. CPOR-P register 55 is coupled to a demultiplexer output 50, which carries a respective CBR carrier stream. Adder circuit 57 is coupled to CPOR-P register 55 and to PSPO register 95. PSPO register 95 is coupled to clock offset circuit 11 by CPOR update logic input 56 (FIG. 6), where CPOR update logic input 56 is coupled to second subtraction logic 49. CPO replacement logic 58 is coupled to PSPO register 95, an output of adder circuit 57 and output 59 that is coupled to the respective one of FIFO's 52*a*-52*c*. In one example CPO replacement logic 58 indicates that a CPO has been replaced using an CPRO_Updated signal to trigger the PSPO register 95 to clear to value 0.

Continuing with FIG. 7, CPOR-P is received at CPOR-P register 55 that is indicative of a CPO-P. Adder circuit 57 obtains the calculated PSPO from PSPO register 95 and calculates CPO for respective ones of the CBR carrier streams by adding the calculated PSPO to the CPO-P for the respective CBR carrier stream. CPOR update logic 14*a* replaces CPO-P in CPOR-P with the calculated CPO for the respective CBR carrier stream to generate an updated CPOR for the respective CBR carrier stream that is output to a corresponding FIFO 52*a*-52*f*. Upon replacing the CPOR-P with the calculated CPO, PSPO register 55 is reset to a value of "0." In the present example, there is a single PSPO calculated from the PHY link and the calculated PSPO is shared by all the CBR carriers demultiplexed from the particular PHY link. Alternatively, CPO-P is replaced with a function of the calculated CPO such as an offset to the calculated CPO or an encoding of the calculated CPO.

In the example shown in FIG. 7, source node 1 generates a CPOR placeholder and respective ones of the intermediate nodes update the CPOR it by adding a calculated PSPO that indicates the "phase delta" (e.g., the relative change in phase) of the logical PHY-scaled stream derived from an ingress PHY link and what the node expects to see using its own local reference clock signal 39*a* (i.e., LPSD). The PSPO (e.g., "phase delta") can be positive or negative, e.g. +3,-7, +6, without limitation. Whatever that value is, the node adds it to the received CPOR 40 embedded within the respective CBR carrier stream by adding the calculated PSPO to CPO-P, and replacing CPOR 40 with the resultant value. If the PSPO is negative, the addition will cause the calculated CPO in the outgoing CPOR to be smaller than the CPO-P from the previous network node. If the calculated PSPO is positive, the addition will cause the calculated CPO in the outgoing CPOR to be larger than the CPO-P from the previous network node. In any case, the CPOR update has the effect of accumulating PSPO (e.g., "phase delta") as it traverses the network. It is possible for the CPOR to be lost in transit. If that were to happen, the sink will be missing one set of phase deltas from the intermediate nodes between the source and the sink. The method and apparatus shown in FIG. 8 is intended to address that problem.

Figure 8:
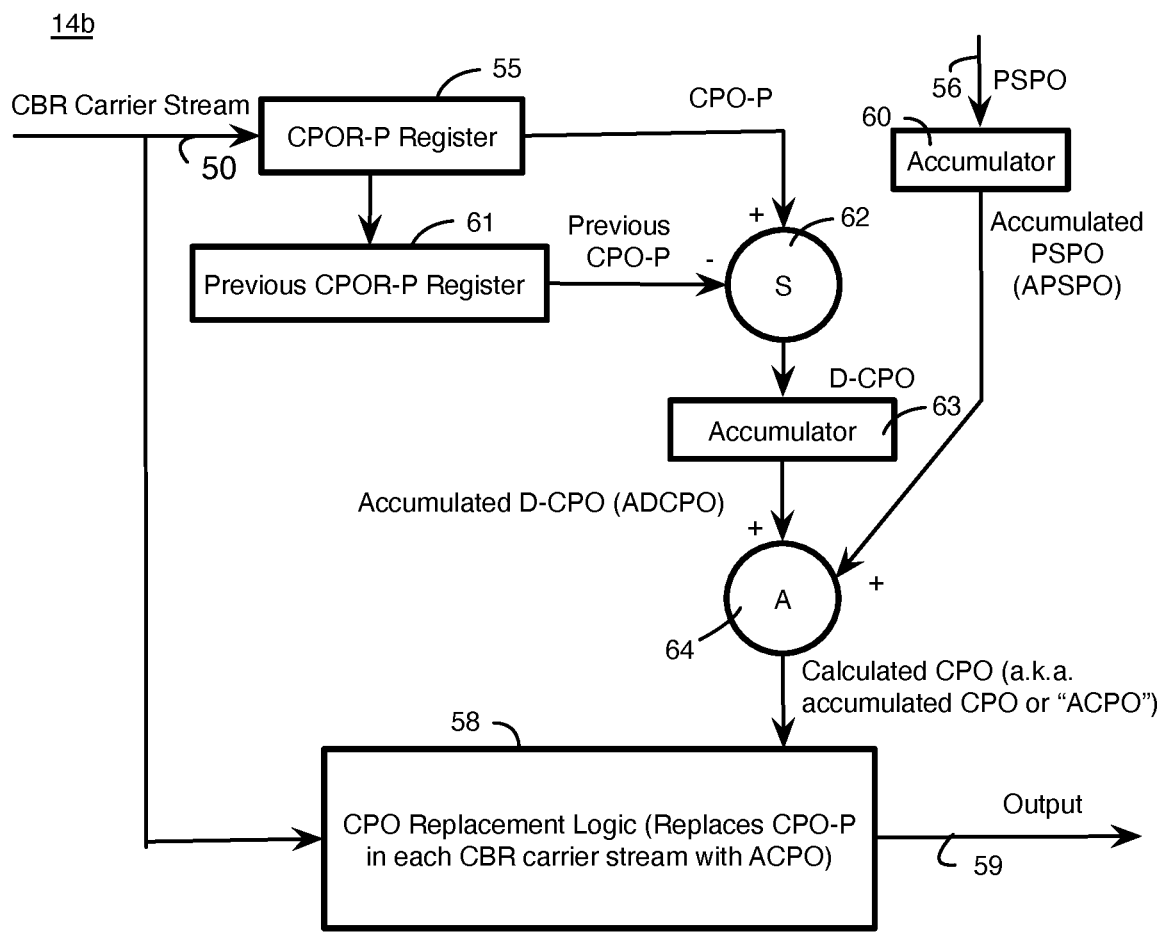
FIG. 8 is a diagram showing an example of CPOR update logic that calculates CPO, where the calculated CPO is a function of all CPO-Ps received by the intermediate-network-node since a last initialization of the intermediate-network-node and all PSPOs calculated by the intermediate-network-node since a last initialization of the intermediate-network-node.

In the alternate example that is shown at FIG. 8 the calculated CPO is a function of all of CPO-P received by the intermediate-network-node 3 since a last initialization of the intermediate-network-node 3 and a function of all PSPO calculated by the intermediate-network-node 3 since the last initialization of the intermediate-network-node 3. In this example, a CPOR update logic 14b is shown that includes CPOR-P register 55, accumulator 60, previous CPOR-P register 61, subtraction logic 62, accumulator 63, adder logic 64, CPO replacement logic 58 and an output 59 coupled to a respective one of FIFO's 52a-52c. Subtraction logic 62 may be implemented by a subtraction circuit and adder logic 64 may be implemented by an adder circuit. CPOR-P register 55 is coupled to a demultiplexer output 50, which carries a respective CBR carrier stream, and to previous CPOR-P register 61. Subtraction logic 62 is coupled to CPOR-P register 55, to previous CPOR-P register 61 and to accumulator 63. Adder logic 64 is coupled to accumulator 63, accumulator 60 and CPO replacement logic 58. Accumulator 60 is coupled to clock offset circuit 11 by CPOR update logic input 56 (FIG. 6). CPO replacement logic 58 is coupled to demultiplexer output 50 and output 59 that is coupled to a respective one of FIFO's 52a-52c.

CPOR update logic 14b receives CPOR-P at CPOR-P register 55 from the respective CBR carrier stream. When a next CPOR-P is received the previous CPOR-P is moved to previous CPOR-P register 61, becoming the "previous CPOR-P" and the received CPOR-P is stored in CPOR-P register 55. Subtraction logic 62 subtracts the CPO-P in the previous CPOR-P, stored in previous CPOR-P register 61, from the present CPO-P in CPOR-P register 55 to obtain a delta cumulative phase offset (D-CPO). Accumulator 63 calculates an accumulated delta cumulative phase offset (ADCPO) by accumulating all of the D-CPO calculated by the particular intermediate-network-node since a last initialization of the particular intermediate-network-node. Accumulator 60 calculates an accumulated PSPO (APSPO) by accumulating all of the calculated PSPO received at input 56 since a last initialization of the particular intermediate-network-node 3. Adder logic 64 adds the ADCPO to APSPO to calculate the CPO, which may also be referred to as an accumulated CPO (ACPO). CPO replacement logic 58 receives the CBR carrier stream and replaces CPO-P in CPOR-P with ACPO to generate an updated CPOR for the respective CBR carrier stream that is output at output 59 to a respective one of FIFO's 52a-52f.

In applications where the PHY links may experience high bit error rates, cells, packets or frames carrying the CPOR may be dropped due to CRC verification failures. The example shown in FIG. 8 is tolerant of dropped CPOR cells, packets or frames. More particularly, instead of calculating CPO by adding PSPO to CPO-P as in the embodiment of FIG. 7, the current incoming CPOR-P and the previous CPOR-P are used to make sure the calculated CPO is correct. If a CPOR is missing, the received CPOR-P would not actually be the previous one but is actually the previous, previous CPOR-P. In the example in which there is a sequence of CPORs, the newest to oldest may be labelled as: CPOR5, CPOR4, CPOR3, CPOR2, CPOR1. CPRO1 is the first to arrive at the last intermediate-network-node 3c. CPOR2 is next to arrive and CPOR5 is the most recent one to arrive. Accumulator 63 accumulates the differences as reflected by every incoming CPOR. Consider the case where CPOR3 is missing due to corruption. The previous CPOR-P register 61 in FIG. 8 would contain CPOR2 and the current CPOR-P register 55 would contain CPOR4. The difference between CPOR4-CPOR2 would be equal to (CPRO3-CPOR2)+(CPOR4-CPOR3). Thus, the value in the accumulator (ADCPO) will catch up to the same value as the scenario where no CPOR has gone missing. Accordingly, the missing CPOR does no lasting damage.

The CBR carrier streams are multiplexed into intermediate-network-node data streams and the intermediate-network-node data streams are transmitted from the respective intermediate-network-node. In FIG. 6, multiplexer 13 receives the output of FIFOs 52a-52f and multiplexes the output of FIFOs 52a-52f (the CBR carrier streams) into intermediate-network-node data streams that are coupled to respective ones of encoders 15, that encode the received intermediate-network-node data stream to output a corresponding INN data stream over respective PHY link outputs 9. The clocks of the PHY link outputs are phase locked to the local reference clock signal 39a received at the local reference clock input 39 via transmit PLL 16. Respective ones of the intermediate-network-node data streams include the CRRs generated by source node 1 and the intermediate-network-nodes 3 are not required to change the content of any of the CRRs. In one example, none of the intermediate-network-nodes 3 change the content of any of the CRRs.

Figure 9:
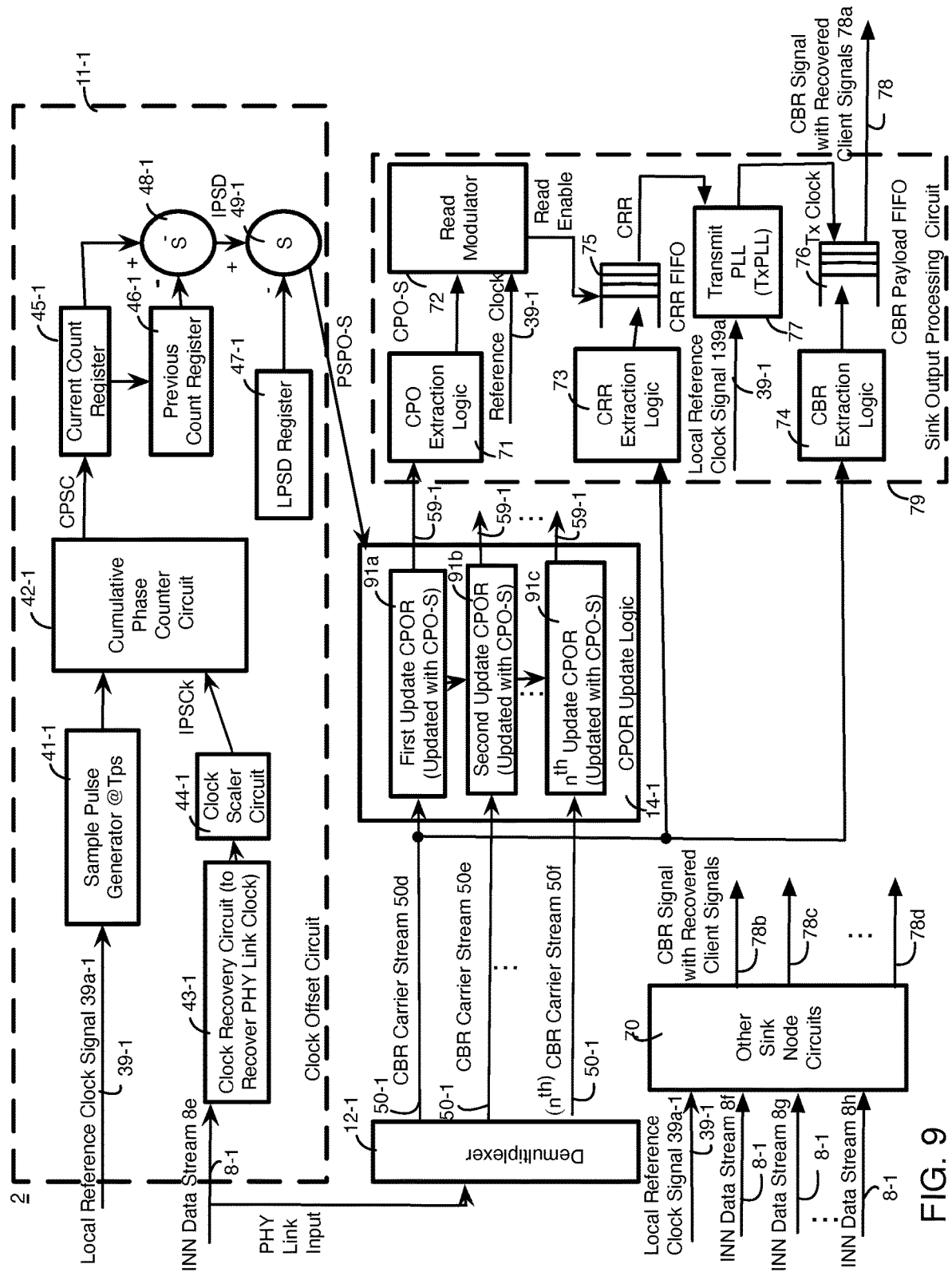
FIG. 9 is a diagram illustrating circuits of the sink node.

FIG. 9 illustrates a sink node 2. In the following discussion many of the operations of sink node 2 are performed in the same way as they are performed at intermediate-network-nodes. To distinguish the calculations at the sink node and the resulting values from those that are performed at intermediate-network-nodes, the corresponding values are indicated as "Sink" values and by adding an "S" to the end of relevant terms, and other terms are distinguished from those of intermediate-network-nodes by adding the phrase "of the sink node" after the respective term, where the numbers of some of the like elements in the sink node are distinguished from those of FIG. 6 by adding "-1" to the respective number of the particular element in FIG. 6.

Sink node 2 includes PHY link inputs 8-1, local reference clock input 39-1 for receiving a local reference clock signal 39a-1, clock offset circuit 11-1, demultiplexer 12-1, CPOR update logic 14-1, sink output processing circuit 79, other sink node circuits 70 and outputs 78a-78d. Demultiplexer 12-1 is coupled to PHY link input 8-1 and CPOR update logic 14-1. Clock offset circuit 11-1 is coupled to local reference clock input 39-1, a PHY link input 8-1 and CPOR update logic 14-1. Sink output processing circuit 79 is coupled to CPOR update logic 14-1 and to output 78. Clock offset circuit 11 includes sample pulse generator 41-1, cumulative phase counter circuit 42-1, clock recovery circuit 43-1, clock scaler circuit 44-1, current count register 45-1, previous count register 46-1, first subtraction logic 48-1, second subtraction logic 49-1 and LPSD register 47-1. First subtraction logic 48-1 and second subtraction logic 49-1 may be implemented as respective subtraction circuits. Sample pulse generator 41-1 is coupled to reference clock input 39-1 and cumulative phase counter circuit 42-1. Clock recovery circuit 43-1 is coupled to a respective PHY link input 8-1, and to clock scaler circuit 44-1. Cumulative phase counter circuit 42-1 is coupled to current count register 45-1 and clock scaler circuit 44-1. Current count register 45-1 is coupled to previous count register 46-1. First subtraction logic 48-1 is coupled to current count register 45-1, previous count register 46-1 and to second subtraction logic 49-1. Second subtraction logic 49-1 is coupled to LPSD register 47-1 and to CPOR update logic 14-1.

Sink output processing circuit 79 includes CPO extraction logic 71, read modulator 72, CRR extraction logic 73, CBR extraction logic 74, CRR FIFO 75, CBR payload FIFO 76 and transmit PLL 77. CPO extraction logic 71 is coupled to the output 59-1 of CPOR update logic 14-1 that outputs CBR carrier stream 50d with an updated CPOR and is coupled to read modulator 72. CRR extraction logic 73 and CBR extraction logic 74 are coupled to an output 50-1 of demultiplexer 12-1 to receive one of CBR carrier streams 50a-50c. CRR FIFO 75 is coupled to read modulator 72, CRR extraction logic 73 and transmit PLL 77. Transmit PLL 77 is coupled to local reference clock input 39-1. CBR payload FIFO 76 is coupled to CBR extraction logic 74 and transmit PLL 77. Other sink node circuits 70 are coupled to local reference clock input 39-1, PHY link inputs 8 and outputs 78b-78d.

Intermediate-network-node data streams 8e-8h are received at the sink node 2. In FIG. 9 clock offset circuit 11-1 of the sink node receives an INN data stream at a PHY link input 8-1 and clock offset circuit 11-1 measures a bit count of the received INN data stream based on a local reference clock signal 39a-1 of the sink node and calculates PSPO-S for the received intermediate-network-node data stream. In the present example PSPO-S is calculated in the same manner as the PSPO calculated at intermediate-network-nodes and indicates the difference between the CPSC increment in the particular INN data stream received at the sink node and LPSD.

Following is an example that illustrates processing of a single INN data streams 8e to obtain the CBR signal with recovered client signals 78a. The processing of the other INN data streams 8f-8h can be performed in the same manner as that of INN data stream 8e and some or all of the apparatus shown in FIG. 9 for processing INN data stream 8e may be included in other sink node circuits 70 for processing INN data streams 8f-8h (e.g., other sink node circuits 70 can include an identical set of circuits for processing each of INN data streams 8f-8h). PHY link input 8-1 of the sink node receives intermediate-network-node data stream 8e from the last intermediate-network-node. Clock offset circuit 11-1 of the sink node is coupled to the PHY link input 8-1 of the sink node to: sample a counter accumulating an IPSCk at the sink node at Tps of a local reference clock of the sink node to obtain a CPSC at the sink node, the IPSCk generated by scaling a clock recovered from the received intermediate-network-node data stream of the last intermediate-network node 8e to Fipsck_nom, and calculate a PSPO at the sink node (PSPO-S) that indicates the phase difference between a LPSD at the sink node and an IPSD at the sink node, where the IPSD at the sink node indicates the CPSC increment between successive CPSC samples at the sink node. Demultiplexer of the sink node 12-1 is coupled to the PHY link input of the sink node 8-1 to demultiplex the intermediate-network-node data stream received from the last intermediate-network-node 8e to obtain the individual CBR carrier streams at the sink node 50d-50f CPOR update logic of the sink node 14-1 is coupled to the clock offset circuit 11-1 to calculate a CPO at the sink node (CPO-S) for respective ones of the CBR carrier streams 50d-50f by adding the PSPO-S to a CPO-P received at the sink node (i.e., received from the last intermediate-network-node) for the respective CBR data stream 50d-50f Sink output processing circuit 79 is coupled to demultiplexer of the sink node 12-1 and the CPOR update logic of the sink node 14-1 to recover the CBR client signals using the CPO-S and the CRR corresponding to the particular CBR signal. PHY link output of the sink node 78 is coupled to sink output processing circuit 78 to output from the sink node CBR signals that include the recovered CBR client signals.

In one example CPO-S is calculated in the same manner as illustrated with regard to FIG. 7, where calculating the CPO-S includes adding the calculated PSPO-S to a CPO-P received at the sink node for the respective CBR data stream (e.g., the CPO-P from the last-intermediate-network-node). In one example intermediate-network-node data stream 8e includes a CPOR-P that indicates a CPO-P from the last intermediate-network-node that is demultiplexed to obtain the individual CBR carrier streams 50d-50f that are output at respective demultiplexer outputs 50-1. CPOR update logic 14-1 calculates a CPO-S for carrier stream 50d that replaces the CPO-P in CBR carrier stream 50d to form a first updated CPOR at the sink node 91a. CPOR update logic 14-1 calculates a CPO-S for carrier stream 50e that replaces the CPO-P in CBR carrier stream 50e to form a second updated CPOR at the sink node 91b and so forth to the $n^{th}$ CPO-S 91c for the $n^{th}$ CBR carrier stream 50f In another example CPO-S is calculated in the same manner as illustrated with regard to FIG. 8, where CPOR update logic 14b receives CPOR-P at CPOR-P register 55 from the respective CBR carrier stream 50d-50f that is a CPOR-P from the last intermediate-network-node. When a next CPOR-P is received the previous CPOR-P is moved to previous CPOR-P register 61, becoming the "previous CPOR-P" at the sink node and the received CPOR-P is stored in CPOR-P register 55. Subtraction logic 62 subtracts the CPO-P in the previous CPOR-P, stored in previous CPOR-P register 61 from the present CPO-P in CPOR-P register 55 to obtain a delta cumulative phase offset (D-CPO) at the sink node. Accumulator 63 calculates a sink accumulated delta cumulative phase offset (ADCPO-S) by accumulating all of the D-CPO calculated by the sink node since a last initialization of the sink node. Accumulator 60 calculates a sink accumulated PSPO (APSPO-S) by accumulating all of the calculated PSPO received at input 56 since a last initialization of the sink node. Adder logic 64 adds the ADCPO-S to APSPO-S to calculate the CPO-S. CPO replacement logic 58 receives the CBR carrier stream 50d-50f and replaces CPO-P in CPOR-P with the calculated CPO-S to generate an updated CPOR for the respective CBR carrier stream 50d-50f that is output at output 59 to CRR extraction logic 71.

Optionally the CPO-P received at the sink node is replaced with the CPO-S for the respective CBR carrier stream (e.g., so that the circuits of CPOR update logic 14 is the same as CPOR update logic 14-1 for simplified design and manufacture). Sink output processing circuit 79 recovers the CBR client signals using the CPO-S and the CRR corresponding to the particular CBR signal. PHY link output 78 is coupled to the sink output processing circuit 79 to output from the sink node CBR signals 78a that include the recovered CBR client signals.

In FIG. 9 a single sink output processing circuit 79 is illustrated to show the processing of the 91a and CBR carrier stream 50d. However, in one example, a sink output processing circuit 79 includes similar or identical circuits that are coupled to each output 59 that operate in the same manner as the sink output processing circuit 79 that is illustrated for processing the first updated CPOR at the sink node 91a and the first carrier stream 50d.

In one example, CRR extraction logic 73 extracts the incoming CRR from CBR carrier stream 50d and stores it in CRR FIFO 75. CRR FIFO 75 is read out nominally at Tcrr as measured by the local reference clock and the phase value in the CRR is sent to transmit PLL 77 as the reference input phase. In one example CPOR update logic 14-1 generates a new CPOR at first updated CPOR at the sink node 91a. The new CPOR is coupled to CPO extraction logic 71 that extracts CPO-S and indicates a corresponding CPO-S to read modulator 72. In the example shown in FIG. 7, CPO-S can be taken from CPOR update logic 14-1 directly and used by read modulator 72 to modulate the instance at which a CRR is read out of CRR FIFO 75. However, in the example shown in FIG. 8, since the CPO is a cumulative value, the previous CPO-S is subtracted from the new CPO-S to identify a CPO-S to be used by read modulator 72 to modulate the instance at which a CRR is read out of CRR FIFO 75. If CPO-S indicates that there is a positive ppm offset between the reference clock at the source node relative to the sink node (RPPMpath is positive), the CRR FIFO is read more frequently than Tcrr. Conversely, if CPO-S indicates that there is a negative ppm offset between the reference clock relative to the sink node (if RPPMpath is negative), the CRR FIFO is read less frequently than Tcrr. CBR extraction logic 74 receives CBR carrier stream 50d and extracts the CBR client signals, coupling them to CBR payload FIFO 76. Transmit PLL 77 is coupled to local reference clock input 39-1 and receives the reference clock signals 39a-1 and provides transmit clock signals to CBR payload FIFO 76 to re-generate a phase-locked copy of the client stream of the source node. Implementation alternatives to modulating CRR FIFO read instances are described in U.S. Pat. Nos. 8,542,708 and 9,019,997, that are incorporated herein by reference in their entirety.

Figure 10A:
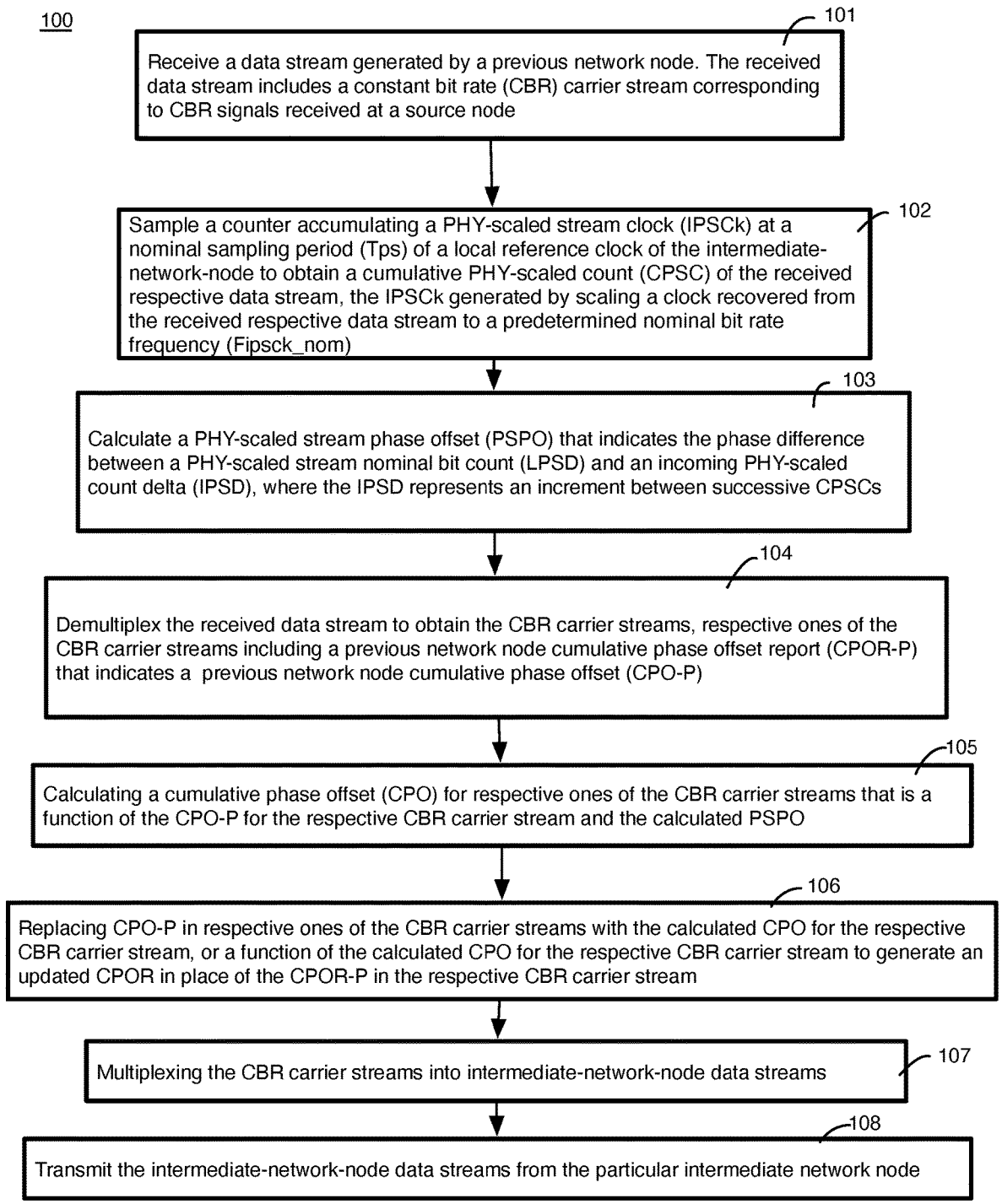
FIG. 10A is a flow diagram illustrating a method for coupling CBR signals over a network.

FIG. 10A illustrates blocks of a method 100 in which a data stream generated by a previous network node is received (101). The received data stream includes a CBR carrier stream corresponding to CBR signals received at a source node. A counter accumulating IPSCk is sampled (102) at a Tps of a local reference clock of the intermediate-network-node to obtain a CPSC of the received respective data stream, the IPSCk generated by scaling a clock recovered from the received respective data stream to Fipsck_nom. A PSPO is calculated (103) that indicates the phase difference between a LPSD and an IPSD, where the IPSD represents an increment between successive CPSCs. In one example, LPSD represents the expected amount of increment at the intermediate-network-node based on the Fipck_nom and the Tps. In one example that is illustrated in block 103-1 of FIG. 10B PSPO is calculated by: by calculating an IPSD that indicates the increase in bit count within the Tps (e.g., by subtracting the previous CPSC from the current CPSC); and subtracting the LPSD from the IPSD), where the calculated PSPO is in units of phase and LPSD is a function of the Fipsck_nom and the Tps.

The received data stream is demultiplexed (104) to obtain the CBR carrier streams, respective ones of the CBR carrier streams including a CPOR-P that indicates a CPO-P. In an example that is illustrated in block 104-1 of FIG. 10C each of the CBR carrier streams also include a CRR that indicates a measured bit count of the respective CBR client at the source node. In one example the intermediate-network-nodes 3-3c do not change the content of CRRs. In one example the intermediate-network-nodes are not required to terminate any of the CRRs, generate new CRRs or change the content of any of the CRRs. In one example the intermediate-network-nodes 3-3c do not terminate any of the CRRs, generate new CRRs or change the content of any of the CRRs.

A CPO is calculated (105) for respective ones of the CBR carrier streams (e.g., each of the CBR carrier streams) and CPO-P for respective ones of the CBR carrier streams (e.g., each of the CBR carrier streams) is replaced (106) with the calculated CPO for the respective CBR carrier stream, where the calculated CPO is a function of the CPO-P for the particular carrier stream and the calculated PSPO. In an example that is illustrated in block 105-1 of FIG. 10D CPO is calculated by adding the calculated PSPO to the CPO-P. In an example that is illustrated in block 105-2 of FIG. 10E CPO is a function of all CPO-Ps received by the intermediate-network-node since a last initialization of the intermediate-network-node. In an example that is illustrated in block 105-3 of FIG. 10F the CPO is an accumulated PSPO (ACPO) calculated by: calculating delta cumulative phase offset (D-CPO) by subtracting a previously received CPO-P from the CPO-P; calculating an accumulated D-CPO (ADCPO) by accumulating all D-CPO calculated by the intermediate network node since a last initialization of the intermediate-network-node; calculating an accumulated PSPO (APSPO) by accumulating all of the PSPO calculated by the intermediate-network-node since the last initialization of the intermediate-network-node; and adding APSPO to ADCPO).

The CBR carrier streams are multiplexed into intermediate-network-node data streams (107) and the intermediate-network-node data streams are transmitted (108) from the respective intermediate-network-node.

Figure 10G:
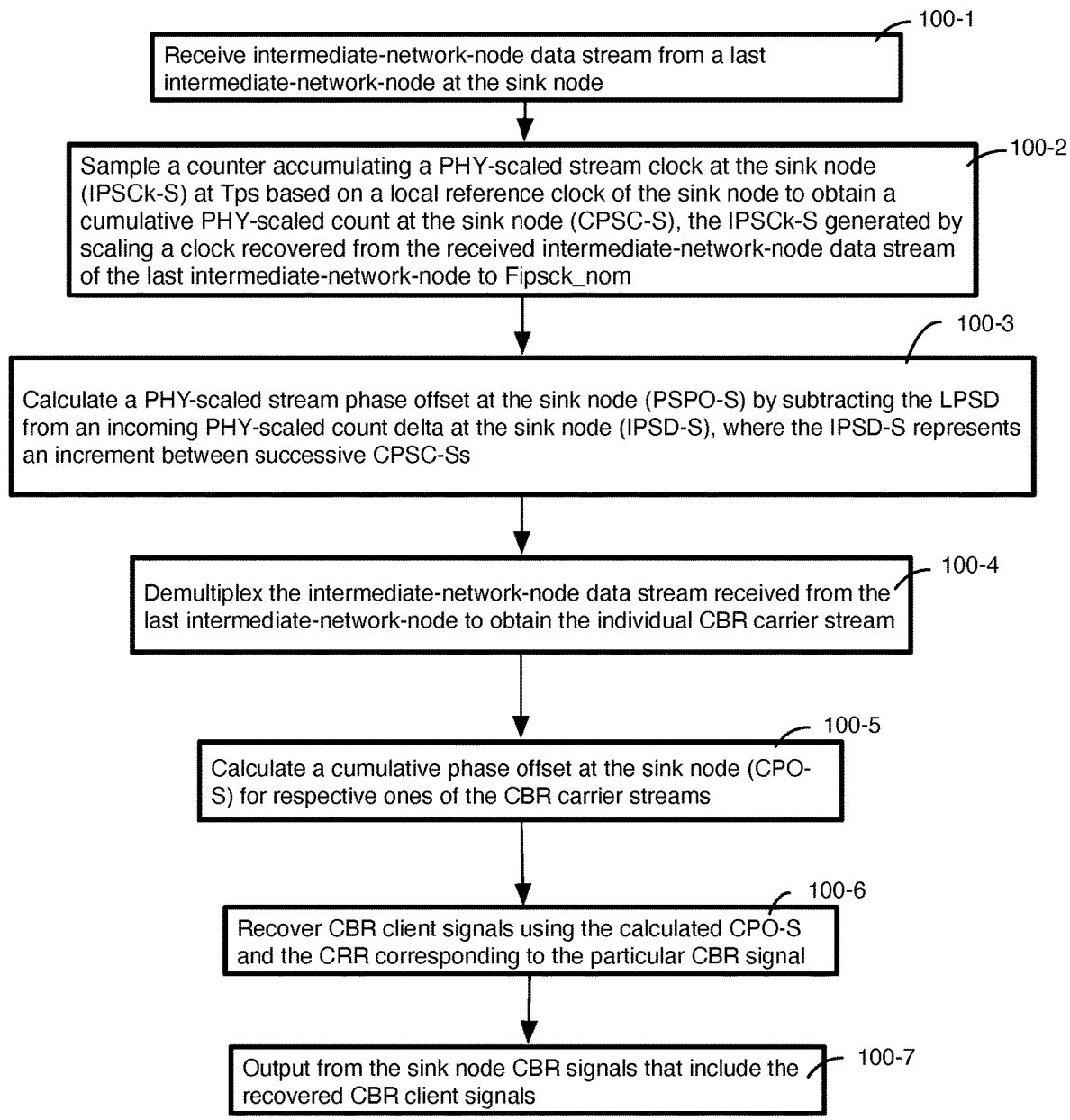

FIG. 10G illustrates blocks of method 100 that are performed at a sink node. Intermediate-network-node data streams are received (100-1) from a last intermediate-network-node at a sink node. A counter accumulating a PHY-scaled stream clock at the sink node (IPSCk-S) is sampled (100-2) at Tps based on a local reference clock of the sink node to obtain a cumulative PHY-scaled count at the sink node (CPSC-S), the IPSCk-S generated by scaling a clock recovered from the received intermediate-network-node data stream of the last intermediate-network node to Fipsck_nom. A PHY-scaled stream phase offset at the sink node (PSPO-S) is calculated (100-3) by subtracting the LPSD at the sink node from the incoming PHY-scaled count delta at the sink node (IPSD-S), where the IPSD-S represents increments between successive CPSC-Ss, which may be referred to as a CPSC-S increment. The received intermediate-network-node data stream from the last intermediate-network-node is demultiplexed (100-4) to obtain the individual CBR carrier streams.

A CPO is calculated (100-5) at the sink node (CPO-S) for respective ones of the CBR carrier streams. In an example that is illustrated in block 100-5-1 of FIG. 10H calculating the CPO-S includes adding the calculated PSPO-S to a CPO-P received at the sink node for the respective CBR data stream. In an example that is illustrated in block 100-5-2 of FIG. 10I the calculated CPO-S is an ACPO calculated by: calculating a delta cumulative phase offset (D-CPO) at the sink node by subtracting a previously received CPO-P received at the sink node from a CPO-P received at the sink node; calculating a sink accumulated D-CPO (ADCPO-S) by accumulating all of the D-CPO calculated by the sink node since a last initialization of the sink node; calculating a sink accumulated PSPO (APSPO-S) by accumulating all of the PSPO calculated by the sink node since a last initialization of the sink node; and adding the APSPO-S to the ADCPO-S.

CBR client signals are recovered (100-6) using the calculated CPO-S and the CRR corresponding to the particular CBR signal. CBR signals that include the recovered CBR client signals are output (100-7) from the sink node.

In accordance with the methods and apparatus of the present invention, the ppm offset of respective ones of the nodes is represented in the CPOR produced by the respective one of the nodes. At the sink node, the CPOR received is generated by the last switching node and thus, only need to be biased by the relative ppm offset between the last switching node and the sink node (RPPMsk). The CRR is generated by the source node and is forwarded verbatim to the sink node. The ppm offset of the source node is represented in the CRR, which can be based on ITU GMP or similar schemes. The sink node uses the relative ppm offset between the source and sink nodes (RPPMpath) to bias the processing of the received CRR.

The present method and apparatus measure the ppm offset between pairs of nodes and then sums the measured ppm offsets together to get the source to sink ppm offset. In source node 1, there are actually two ppm offsets at play. One is the ppm offset of the CBR client from its nominal value. This is what the CRR encodes. Unfortunately, while doing so, the measurement is tainted by the ppm offset of the local reference clock at the source node 1. This is the second ppm offset. For example, when the CBR client is 10 ppm faster than its nominal value, the CRR will only indicates such a 10 ppm value if the local reference clock 20 is perfectly nominal. If the source local reference clock 20 is also 10 ppm fast, the CRR would spuriously report a nominal value.

The present method and apparatus convey RPPMpath to sink output processing circuit 79 using CPOR's, thereby avoiding the problem of the measurement being tainted by the reference clock at source node 1. Because the present method and apparatus shares a common mathematical basis with the ITU GMP scheme, both are expected to have similar jitter and wander performance.

Following is an example in which network 4 of FIG. 1 includes intermediate-network-node switches 3a-3c. In this example, the PHY-scaled stream phase offset measured at the first intermediate-network-node switch 3a is indicated by $PSPO_1$, the PHY-scaled stream phase offset measured at the second intermediate-network-node switch 3b is indicated by $PSPO_2$, the PHY-scaled stream phase offset measured at the third intermediate-network-node switch 3c is indicated by $PSPO_3$, the PHY-scaled stream phase offset measured at the sink node switch 2 is indicated by PSPO-S. In this example, $CPO_0$ transmitted to the first intermediate-network-node switch 3a will have an initial value of zero. At the output of intermediate-network-node switch 3a, the CPO in the intermediate-network-node data stream will have a calculated CPO ($CPO_1$) that reflects the sum of 0 (the initial CPO value) and $PSPO_1$. At the output of intermediate-network-node switch 3b the CPO in the intermediate-network-node data stream will have a calculated CPO ($CPO_2$) that is $PSPO_1+PSPO_2$. At the output of intermediate-network-node switch 3c the CPO in the intermediate-network-node data stream will have a calculated CPO ($CPO_3$) that is $PSPO_1+PSPO_2+PSPO_3$. The corresponding CPO-S calculated at sink node 2 will be $PSPO_1+PSPO_2+PSPO_3+PSPO$-S. Thereby the CPO-S will be the accumulation of all of the relative PPM offsets in the path and will indicate the relative parts per million of the entire path (RPPMpath).

In one example, the ppm offset of the local reference clock in the source node is PPMsrc from nominal. The measured rate of the CBR client at the source node is encoded into a periodic CRR. The nominal period between CRR is Tcrr, as measured by the local reference clock at source node 1. The CPOR of the carrier stream is nominally generated once per period of Tcpor as measured by the local reference clock of the source node 1. CPOR may be initialized to 0, or some other predetermined value.

In this example, respective ones of intermediate-network-node switches 3a-3c demultiplex respective ones of the data streams (e.g., each of the data streams) into a set of n CBR carrier streams, one for respective ones of CBR signals and monitors respective ones of the carrier streams for the presence of the CPOR. The PSPO, which is common to all CBR carriers sharing the same PHY link, is then summed into the incoming CPOR by CPOR update logic 14. Because CPORs are generated more frequently than PSPO (Tps>Tcpor), there are more CPOR values than PSPO values over any given time period. In one example, once a PSPO has been summed into the CPOR of a CBR carrier, subsequent CPOR of that CBR carrier will be left unmodified until a new PSPO is available. In another example, once a PSPO has been summed into the CPOR of a CBR carrier, a subsequent CPOR of that CBR carrier will be updated using the same PSPO until a new PSPO is available.

In one example the calculated CPO can be either a positive number (when the measured bit count is greater than the PHY-scaled stream nominal bit count value) or a negative number (when the measured bit count is less than the PHY-scaled stream nominal bit count value). In one example, when the measured bit count is greater than the PHY-scaled stream nominal bit count value, CPOR update logic 14 calculates CPO by adding the PSPO to P-CPO; and when the measured bit count is less than the PHY-scaled stream nominal bit count value, CPOR update logic 14 calculates CPO by adding the calculated PSPO (a negative value) to CPO-P.

Figure 11:
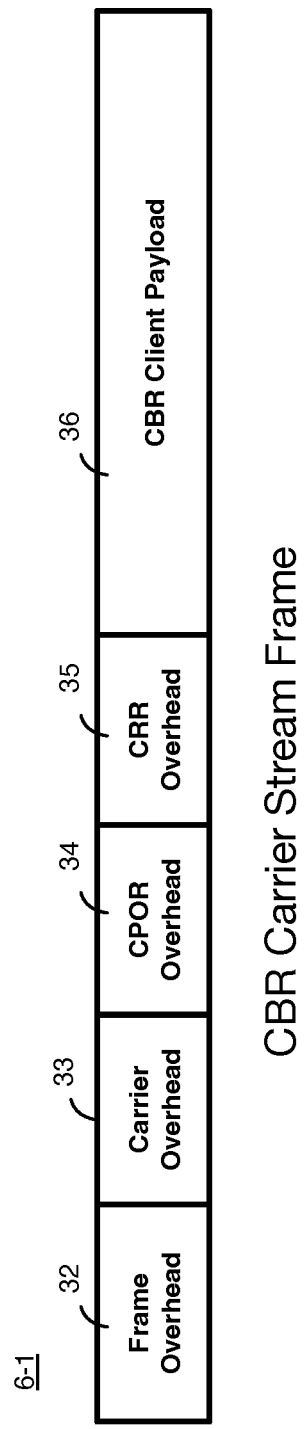
FIG. 11 is a block diagram illustrating a CBR carrier stream frame.
Figure 13:
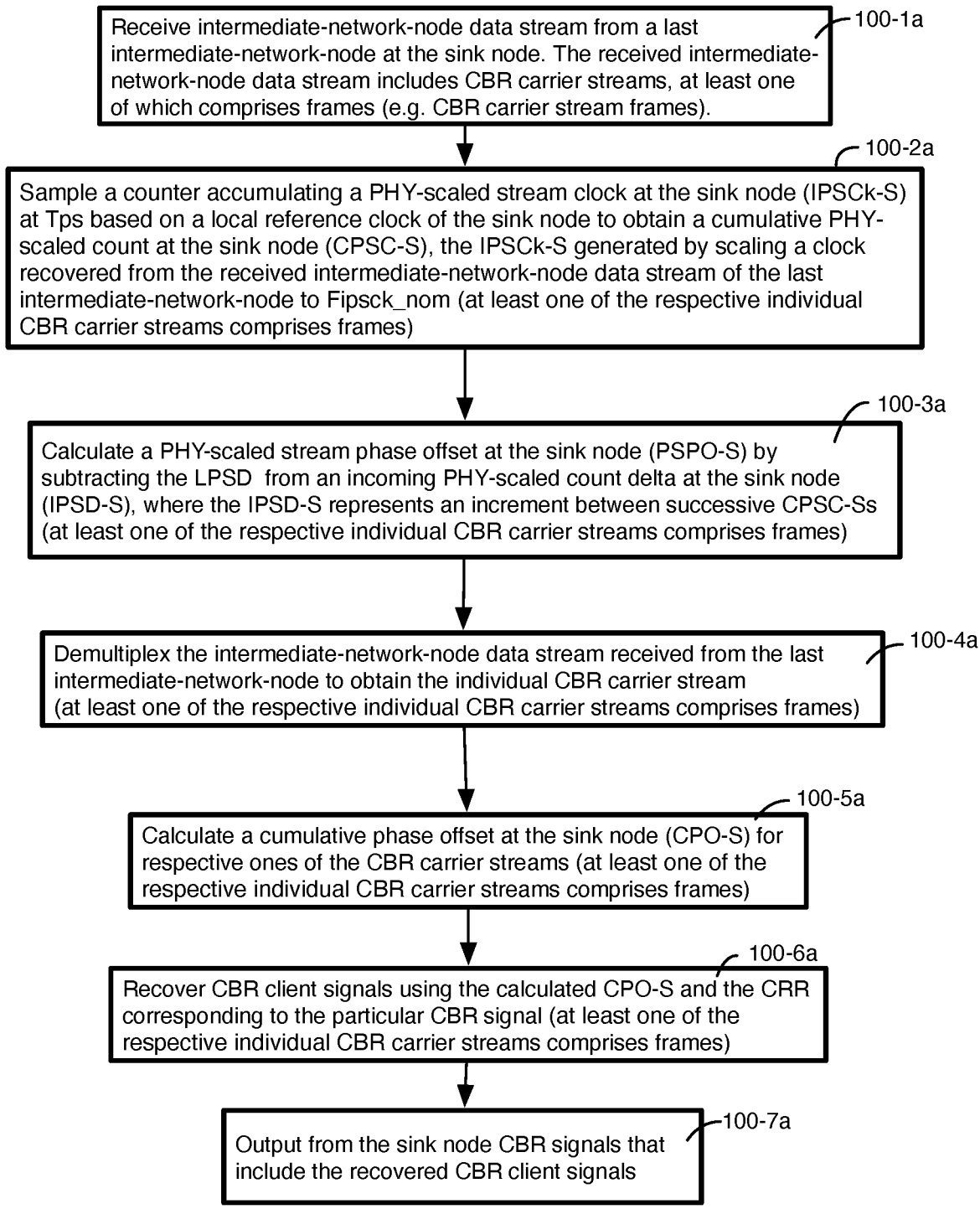
FIG. 13 is a flow diagram illustrating blocks in a method for coupling CBR signals over a network in which at least one of the respective individual CBR carrier streams comprises frames.

As previously discussed with reference to FIG. 4, the CBR carrier streams can be in the form of cells, packets and/or frames. In one example that is illustrated in FIGS. 11-13 CBR carrier stream cell, packet or frame 6 is a frame, illustrated in FIG. 11 as CBR carrier stream frame 6-1 that includes frame overhead 32, carrier overhead 33, CPOR overhead 34, CRR overhead 35 and CBR client payload 26. CBR carrier stream frame 6-1 can have an ITU-G-709 ODU frame format or a similar format. In one example CBR carrier stream frame 6-1 has a format similar to that of an ITU-G-709 ODU frame except that the format is modified to include CPOR overhead 34 and CRR overhead 35.

In this example, at the source node 1, CBR mapper 21 generates for respective ones of the CBR signals a corresponding CBR carrier stream and inserts the CRR and CBR client data into a respective CBR carrier stream. At least one of the respective individual CBR carrier streams comprises frames.

FIG. 12 illustrates a method 100a in which at least one of the CBR carrier streams comprises frames. In one example, the functions of blocks 101a, 102a, 103a, 104a, 105a, 106a, 107a and 108a are the same as that of respective blocks 101-108 of method 100 shown in FIG. 10A, except that, in method 100a at least one of the respective individual CBR carrier streams comprises frames. Referring now to block 101a, the received data stream includes CBR carrier streams, at least one of which comprises frames. The CBR carrier stream frames received in step 101a can be CBR carrier stream frames 6-1 shown in FIG. 11. In one example, in step 101a multiple CBR carrier streams are received, respective ones of the multiple CBR carrier streams comprise frames. In this example, the demultiplexing of step 104a obtains the individual CBR carrier streams, at least one of which comprises frames (e.g., CBR carrier stream frames 6-1). In step 107a the CBR carrier stream frames are multiplexed into the intermediate-network-node-node data streams such that at least one of the CBR carrier streams in the respective individual intermediate-network-node data streams transmitted in step 108a comprises frames (e.g., CBR carrier stream frames 6-1).

In the example shown in FIGS. 5 and 6, respective ones of PHY link inputs 8 receive a data stream generated by a previous network node that includes a plurality of CBR carrier streams, at least one of which comprises frames (i.e., at least one of the respective individual CBR carrier streams comprises frames). More particularly, respective PHY link inputs 8 receive a data stream generated by a previous network node where respective received data streams include CBR carrier streams, at least one of which comprises frames. Accordingly, multiplexer 13 multiplexes CBR carrier streams (at least one of which comprise frames) into the intermediate-network-node data streams output over respective PHY link outputs 9. More particularly, at least one of CBR carrier streams 50a-50c comprise frames and encoders 15 output respective intermediate-network-node data streams that include CBR carrier streams, where at least one of the CBR carrier streams in the respective CBR carrier stream 50a-50c that is output comprises frames.

FIG. 13 illustrates blocks of a method in which at least one of the CBR carrier streams comprises frames. In one example, the functions of blocks 100-1a, 100-2a, 100-3a, 100-4a, 100-5a, 100-6a, 100-7a and 100-8a are the same as that of respective blocks 100-1, 100-2, 100-3, 100-4, 100-5, 100-6, 100-7 and 100-8 shown in FIG. 10G, except that, at least one of the CBR carrier streams comprises frames. As shown by step 101-1a, the intermediate-network-node data stream received at the sink node from the last intermediate-network node includes CBR carrier streams, at least one of which comprises frames. In one example, in step 100-1a multiple CBR carrier streams are received, where at least one of the received respective individual CBR carrier streams comprises frames (e.g., CBR carrier stream frames). In one example the CBR carrier stream frames received in step 101-1a are CBR carrier stream frames 6-1 shown in FIG. 11. In another example, respective CBR individual carrier streams received in step 101-1a have a different format than that shown in FIG. 11. In this example, the demultiplexing of step 100-4a obtains the individual CBR carrier streams, where at least one of the respective individual CBR carrier streams comprises frames (e.g., CBR carrier stream frames 6-1).

In the example shown in FIG. 9, when at least one of the CBR carrier streams comprises frames, respective PHY link inputs 8-1 of sink node 2 receive intermediate-network-node data streams 8e-8h that comprise CBR carrier streams 50d-50f, where at least one of CBR carrier streams 50d-50f comprises frames.

For clarity and brevity, as well as to avoid unnecessary or unhelpful cluttering, obfuscating, obscuring, obstructing, or occluding features or elements of an example of the disclosure, certain intricacies and details, which are known generally to artisans of ordinary skill in related technologies, have been omitted or discussed in less than exhaustive detail. Any such omissions or discussions are deemed unnecessary for describing examples of the disclosure, and/or not particularly relevant to achieving an understanding of significant features, functions, elements and/or aspects of the examples of the disclosure described herein.

In the specification and figures herein, examples implementations are thus described in relation to the claims set forth below. The present disclosure is not limited to such examples however, and the specification and figures herein are thus intended to enlighten artisans of ordinary skill in technologies related to integrated circuits in relation to appreciation, apprehension and suggestion of alternatives and equivalents thereto.

The invention claimed is:

1. A method comprising:
    receiving at an intermediate-network-node a data stream generated by a previous network node, wherein the received data stream includes constant bit rate (CBR) carrier streams, at least one of which comprises frames, respective CBR carrier streams corresponding to CBR signals received at a source node;
    sampling a counter accumulating a Physical Layer (PHY)-scaled stream clock (IPSCk) at a nominal sampling period (Tps) of a local reference clock of the intermediate-network-node to obtain a cumulative PHY-scaled count (CPSC) of the received respective data stream, the IPSCk generated by scaling a clock recovered from the received respective data stream to a predetermined nominal frequency (Fipsck_nom);
    calculating a PHY-scaled stream phase offset (PSPO) that indicates the phase difference between a PHY-scaled stream nominal bit count (LPSD) and an incoming PHY-scaled count delta (IPSD), where the IPSD indicates an increment between successive CPSCs;
    demultiplexing the received data stream to obtain the CBR carrier streams, respective ones of the CBR carrier streams including a previous network node cumulative phase offset report (CPOR-P) that indicates a previous network node cumulative phase offset (CPO-P), and a client rate report (CRR) that indicates a measured bit count of a respective CBR client at the source node;
    calculating a cumulative phase offset (CPO) for respective ones of the CBR carrier streams that is a function of the CPO-P for the respective CBR carrier stream and the calculated PSPO;
    replacing CPO-P in respective ones of the CBR carrier streams with the calculated CPO for the respective CBR carrier stream, or a function of the calculated CPO for the respective CBR carrier stream, to generate an updated CPOR in place of the CPOR-P in the respective CBR carrier stream;
    multiplexing the CBR carrier streams into intermediate-network-node data streams; and
    transmitting the intermediate-network-node data streams from the particular intermediate-network-node.

2. The method of claim 1 wherein the LPSD is a function of the Fipsck_nom and the Tps, and wherein the PSPO is in units of phase, and wherein the calculating the PSPO comprising:
    calculating the IPSD; and
    subtracting the LPSD from the IPSD.

3. The method of claim 1 wherein the CPO is calculated by adding the calculated PSPO to the CPO-P.

4. The method of claim 1 wherein the calculated CPO is a function of all CPO-Ps received by the intermediate-network-node since a last initialization of the intermediate-network-node.

5. The method of claim 1 wherein the calculating the CPO comprises:
    calculating a delta cumulative phase offset (D-CPO) by subtracting a previously received CPO-P from the CPO-P;
    calculating an accumulated D-CPO (ADCPO) by accumulating all of the D-CPO calculated by the intermediate-network-node since a last initialization of the intermediate-network-node;
    calculating an accumulated PSPO (APSPO) by accumulating all of the PSPOs calculated by the intermediate-network-node since the last initialization of the intermediate-network-node; and
    adding the APSPO to the ADCPO.

6. The method of claim 1 wherein the source node measures a bit rate for respective ones of the CBR clients in a CBR signal based on a local reference clock of the source node and encodes into respective ones of the CBR carrier streams the CRR that indicates the measured bit rate of the respective CBR client, and wherein the intermediate-network-node does not change the content of respective ones of the CRRs.

7. The method of claim 1 further comprising:
receiving intermediate-network-node data stream from a last intermediate-network-node at a sink node, the received intermediate-network-node data stream including CBR carrier streams, at least one of which comprises frames;
sampling a counter accumulating a PHY-scaled stream clock at the sink node (IPSCk-S) at Tps based on a local reference clock of the sink node to obtain a cumulative PHY-scaled count at the sink node (CPSC-S), the IPSCk-S generated by scaling a clock recovered from the received intermediate-network-node data stream of the last intermediate-network node to Fipsck_nom;
calculating a PHY-scaled stream phase offset at the sink node (PSPO-S) by subtracting the LPSD from the incoming PHY-scaled count delta at the sink node (IPSD-S), where the IPSD-S represents an increment between successive CPSC-Ss;
demultiplexing the received intermediate-network-node data stream from the last intermediate-network-node to obtain the individual CBR carrier streams;
calculating a CPO at the sink node (CPO-S) for respective ones of the CBR carrier streams;
recovering CBR client signals using the calculated CPO-S and the CRR corresponding to the particular CBR signal; and
outputting from the sink node CBR signals that include the recovered CBR client signals.

8. The method of claim 7 wherein calculating the CPO-S comprises adding the calculated PSPO-S to a CPO-P received at the sink node for the respective CBR data stream.

9. The method of claim 7 wherein calculating CPO-S comprises:
calculating a delta cumulative phase offset (D-CPO) at the sink node by subtracting a previously received CPO-P received at the sink node from a CPO-P received at the sink node;
calculating a sink accumulated D-CPO (ADCPO-S) by accumulating all of the D-CPO calculated by the sink node since a last initialization of the sink node;
calculating a sink accumulated PSPO (APSPO-S) by accumulating all of the PSPO calculated by the sink node since a last initialization of the sink node; and
adding the APSPO-S to the ADCPO-S.

10. An integrated circuit (IC) device for an intermediate-network-node, comprising:
a Physical Layer (PHY) link input to receive a data stream generated by a previous network node that includes a plurality of constant bit rate (CBR) carrier streams, at least one of which comprises frames, respective ones of the CBR carrier streams including a previous network node cumulative phase offset report (CPOR-P) that indicates a previous network node cumulative phase offset (CPO-P) and a client rate report (CRR) that indicates a measured bit count of a respective CBR client at a source node;
a clock offset circuit coupled to the PHY link input to sample a counter accumulating a PHY-scaled stream clock (IPSCk) at a nominal sampling period (Tps) of a local reference clock of the intermediate-network-node to obtain a cumulative PHY-scaled count (CPSC) of the received respective data stream, the IPSCk generated by scaling a clock recovered from the received respective data stream to a predetermined nominal frequency (Fipsck_nom) and to calculate a PHY-scaled stream phase offset (PSPO) that indicates the phase difference between a PHY-scaled stream nominal bit count (LPSD) and an incoming PHY-scaled count delta (IPSD), where the IPSD indicates an increment between successive CPSCs;
a demultiplexer coupled to the PHY link input to demultiplex the received data stream to obtain the plurality of CBR carrier streams;
a cumulative phase offset report (CPOR) update logic coupled to the demultiplexer and the clock offset circuit to calculate a cumulative phase offset (CPO) for respective ones of the CBR carrier streams, wherein the calculated CPO is a function of the CPO-P and the calculated PSPO, and to replace the CPO-P with the calculated CPO for the respective CBR carrier stream, or with a function of the calculated CPO for the respective CBR carrier stream, and to generate an updated CPOR for the respective CBR carrier stream in place of the CPOR-P in the respective CBR carrier stream;
a multiplexer coupled to the demultiplexer and the CPOR update logic to multiplex the CBR carrier streams into a plurality of intermediate-network-node data streams;
encoders coupled to the multiplexer to encode the plurality of intermediate-network-node data streams; and
PHY link outputs coupled to the encoders to transmit the plurality of intermediate-network-node data streams from the IC device.

11. The IC device of claim 10 wherein the PHY link input, the clock offset circuit, the demultiplexer, the CPOR update logic, the encoders and the PHY link outputs are disposed in a single integrated circuit die.

12. The IC device of claim 10 wherein the CPOR update logic is to calculate the CPO by adding the calculated PSPO to the CPO-P.

13. The IC device of claim 10 wherein the CPOR update logic is to calculate the CPO by:
calculate a delta cumulative phase offset (D-CPO) by subtraction of a previously received CPO-P from the CPO-P;
calculate an accumulated D-CPO (ADCPO) by accumulating of all of the D-CPO calculated by the intermediate-network-node since a last initialization of the intermediate-network-node;
calculate an accumulated PSPO (APSPO) by accumulating of all of the PSPO calculated by the intermediate-network-node since a last initialization of the intermediate-network-node; and
add the ADCPO to the APSPO.

14. The IC device of claim 10 wherein the clock offset circuit includes:
a reference clock input to receive the local reference clock;
a sample pulse generator coupled to the reference clock input to generate a sample pulse at Tps;
a clock recovery circuit coupled to the PHY link input to recover a PHY link clock signal;
a clock scaler circuit coupled to the clock recovery circuit and the sample pulse generator, to scale the recovered PHY link clock signal to the Fipsck_nom to obtain the PHY-scaled stream clock;
a cumulative phase counter circuit coupled to the sample pulse generator and an output of the clock scaler circuit, the cumulative phase counter circuit to sample a counter accumulating the IPSCk at Tps to obtain the CPSC;
a first register coupled to the cumulative phase counter circuit to store the CPSC;

a second register coupled to the first register to store a previous CPSC;
a first subtraction logic coupled to the first and second registers to subtract the previous CPSC from the CPSC to obtain the IPSD;
a third register to store the LPSD; and
a second subtraction logic coupled to the first subtraction logic to subtract LPSD from IPSD to calculate the PSPO.

15. The IC device of claim 10 wherein the intermediate-network-node does not change the content of respective ones of the CRRs.

16. A network comprising:
a source node that includes:
an input to receive a plurality of constant bit rate (CBR) signals,
a cumulative phase offset report (CPOR) generating circuit to generate a CPOR that indicates an initial cumulative phase offset (CPO),
a CRR generating circuit to generate a client rate report (CRR) that indicates a measured bit rate of a respective CBR client, and
a CBR mapper coupled to the input to generate for respective ones of the CBR signals a corresponding CBR carrier stream and to insert the CRR and CBR client data into a respective CBR carrier stream, wherein at least one of the respective individual CBR carrier streams comprises frames,
a source output processing circuit to insert the CPOR into a respective CBR carrier stream and multiplex the CBR carrier streams to generate a plurality of source data streams;
a plurality of intermediate-network-nodes coupled to the source node, respective ones of the intermediate-network-nodes comprising an integrated circuit (IC) device that includes:
a Physical Layer (PHY) link input to receive a data stream generated by a previous network node that includes a plurality of CBR carrier streams, at least one of which comprises frames, respective ones of the CBR carrier streams including a previous network node cumulative phase offset report (CPOR-P) that indicates a previous network node cumulative phase offset (CPO-P) and the CRR;
a clock offset circuit coupled to the PHY link input to:
sample a counter accumulating a PHY-scaled stream clock (IPSCk) at a nominal sampling period (Tps) of a local reference clock of the intermediate-network-node to obtain a cumulative PHY-scaled count (CPSC) of the received respective data stream, the IPSCk generated by scaling a clock recovered from the received respective data stream to a predetermined nominal frequency (Fipsck_nom), and
calculate a PHY-scaled stream phase offset (PSPO) that indicates the phase difference between a PHY-scaled stream nominal bit count (LPSD) and an incoming PHY-scaled count delta (IPSD), where the IPSD indicates an increment between successive CPSCs;
a demultiplexer coupled to the PHY link input to demultiplex the received data stream to obtain the individual CBR carrier streams,
a cumulative phase offset report (CPOR) update logic coupled to the demultiplexer and the clock offset circuit to calculate a CPO for respective ones of the CBR carrier streams, wherein the calculated CPO is a function of the CPO-P for the particular CBR carrier stream and the calculated PSPO, and to replace the CPO-P for the particular CBR carrier stream with the calculated CPO for the respective CBR carrier stream to generate an updated CPOR for the respective CBR carrier stream in place of the CPOR-P for the particular CBR carrier stream,
a multiplexer coupled to the demultiplexer and the CPOR update logic to multiplex the CBR carrier streams into a plurality of intermediate-network-node data streams,
encoders coupled to the multiplexer to encode the plurality of intermediate-network-node data streams, and
PHY link outputs coupled to the encoders to transmit the plurality of intermediate-network-node data streams from the IC device; and
a sink node coupled to a last one of the intermediate-network-nodes for receiving an intermediate-network-node data stream from a last one of the intermediate-network-nodes, recovering CBR client signals; and outputting from the sink node a CBR signal that includes the recovered CBR client signals.

17. The network of claim 16 wherein the plurality of intermediate-network-nodes do not change the content of respective ones of the CRRs.

18. The network of claim 16 wherein the CPOR update logic calculates the CPO by adding the calculated PSPO to the CPO-P.

19. The network of claim 16 wherein the calculated CPO is a function of all of CPO-P received since a last initialization of the respective intermediate-network-node and all of the PSPO calculated since the last initialization of the respective intermediate-network-node.

20. The network of claim 16 wherein the sink node comprises:
a PHY link input of the sink node to receive the intermediate-network-node data stream from the last intermediate-network-node, the received intermediate-network-node data stream including the CBR carrier streams, at least one of which comprises frames;
a clock offset circuit of the sink node coupled to the PHY link input of the sink node to:
sample a counter accumulating a PHY-scaled stream clock at the sink node (IPSCk-S) at Tps of a local reference clock of the sink node to obtain a cumulative PHY-scaled count at the sink node (CPSC-S), the IPSCk-S generated by scaling a clock recovered from the received intermediate-network-node data stream of the last intermediate-network node to Fipsck_nom and
calculate a PSPO at the sink node (PSPO-S) that indicates the phase difference between a LPSD and an incoming PHY-scaled count delta at the sink node (IPSD-S), where the IPSD-S indicates an increment between successive CPSC-Ss;
a demultiplexer of the sink node coupled to the PHY link input of the sink node to demultiplex the intermediate-network-node data stream received from the last intermediate-network-node to obtain the individual CBR carrier streams at the sink node;
a CPOR update logic of the sink node coupled to the clock offset circuit to calculate a CPO at the sink node (CPO-S) for respective ones of the CBR carrier streams by adding the PSPO-S to a CPO-P received at the sink node for the respective CBR data stream;

a sink output processing circuit coupled to the demultiplexer of the sink node and the CPOR update logic of the sink node to recover the CBR client signals using the CPO-S and the CRR corresponding to the particular CBR signal; and a PHY link output of the sink node coupled to the sink output processing circuit to output from the sink node CBR signals that include the recovered CBR client signals.

\* \* \* \* \*